(12) United States Patent
Hsu et al.

(10) Patent No.: US 6,995,794 B2
(45) Date of Patent: Feb. 7, 2006

(54) VIDEO CAMERA WITH MAJOR FUNCTIONS IMPLEMENTED IN HOST SOFTWARE

(75) Inventors: Mark Hsu, Fremont, CA (US); Mitchell Norcross, Harvard, MA (US); Georges Auberger, Emerald Hills, CA (US); Remy Zimmermann, Belmont, CA (US); Sergio Maggi, San Mateo, CA (US); George Sanchez, Fremont, CA (US); Bryed Billerbeck, Mountain View, CA (US); Wei Li, Cupertino, CA (US); Jean-Michel Junien Labrousse, Belmont, CA (US)

(73) Assignee: Logitech Europe S.A., Romanel-sur-Morges (CH)

( * ) Notice: Subject to any disclaimer, the term of this patent is extended or adjusted under 35 U.S.C. 154(b) by 775 days.

(21) Appl. No.: 09/861,279

(22) Filed: May 18, 2001

(65) Prior Publication Data

US 2002/0039139 A1    Apr. 4, 2002

Related U.S. Application Data

(63) Continuation-in-part of application No. 09/464,364, filed on Dec. 15, 1999, and a continuation-in-part of application No. 09/345,167, filed on Jun. 30, 1999, now Pat. No. 6,833,862, and a continuation-in-part of application No. 09/343,934, filed on Jun. 30, 1999, now Pat. No. 6,580,828.

(30) Foreign Application Priority Data

Dec. 28, 2000   (TW) ............................... 89112841 A

(51) Int. Cl.
*H04N 5/217*   (2006.01)
*H04N 9/64*    (2006.01)

(52) U.S. Cl. ...................................... 348/241; 348/243
(58) Field of Classification Search ........ 348/241–248; 382/254, 275
See application file for complete search history.

(56) References Cited

U.S. PATENT DOCUMENTS

| 4,589,026 | A |   | 5/1986  | Ozawa et al.            |
|-----------|---|---|---------|-------------------------|
| 4,673,988 | A | * | 6/1987  | Jansson et al. ... 348/79 |
| 4,758,883 | A |   | 7/1988  | Kawahara et al.         |
| 4,774,565 | A |   | 9/1988  | Freeman                 |
| 4,816,663 | A |   | 3/1989  | Utagawa et al. ... 250/201 |
| 4,884,140 | A |   | 11/1989 | Park ............ 358/168 |

(Continued)

FOREIGN PATENT DOCUMENTS

EP            09173358          5/1999

*Primary Examiner*—Aung Moe
(74) *Attorney, Agent, or Firm*—Townsend and Townsend and Crew, LLP

(57) ABSTRACT

A low cost camera by implementing the major functions in host software is provided. This is accomplished by sending raw, digitized data from the camera directly to the host. The increased volume of raw data is handled by either an improved compression/decompression scheme using lossless compression, using lossy compression or using a shared bus with higher bandwidth. By moving such functions as color processing and scaling to the host, the pixel correction can also be moved to the host. This in turn allows the elimination of the frame buffer memory from the camera. Finally, the camera can use a low cost lens by implementing vignetting, distortion, gamma or aliasing correction with a correction value stored in a register of the camera for later access by the host to perform corrections.

6 Claims, 11 Drawing Sheets

FIG. 2

U.S. PATENT DOCUMENTS

| | | |
|---|---|---|
| 4,979,042 A | 12/1990 | Vogel |
| 5,047,861 A | 9/1991 | Houchin et al. |
| 5,060,071 A | 10/1991 | Ino |
| 5,231,485 A | 7/1993 | Israelsen et al. |
| 5,243,447 A | 9/1993 | Bodenkamp et al. |
| 5,280,361 A | 1/1994 | Ishikawa |
| 5,327,246 A | 7/1994 | Suzuki |
| 5,343,302 A | 8/1994 | Yamashita et al. |
| 5,381,174 A | 1/1995 | de Groot et al. ............ 348/207 |
| 5,434,902 A | 7/1995 | Bruijns ...................... 378/98.7 |
| 5,436,659 A | 7/1995 | Vincent |
| 5,475,441 A | 12/1995 | Parulski et al. |
| 5,477,264 A | 12/1995 | Sarbadhikari et al. |
| 5,486,853 A | 1/1996 | Baxter et al. |
| 5,525,957 A | 6/1996 | Tanaka ...................... 348/220 |
| 5,544,256 A * | 8/1996 | Brecher et al. ............. 382/149 |
| 5,563,405 A | 10/1996 | Woolaway et al. |
| 5,576,757 A | 11/1996 | Roberts et al. ............. 348/207 |
| 5,576,797 A | 11/1996 | Kusaka et al. .............. 396/121 |
| 5,625,413 A | 4/1997 | Katoh et al. ................ 348/246 |
| 5,646,684 A | 7/1997 | Nishizawa et al. |
| 5,694,228 A | 12/1997 | Peairs et al. |
| 5,696,850 A * | 12/1997 | Parulski et al. ............. 382/261 |
| 5,712,680 A | 1/1998 | Hieda |
| 5,748,234 A | 5/1998 | Lippincott |
| 5,784,100 A | 7/1998 | Konishi |
| 5,796,430 A | 8/1998 | Katoh et al. |
| 5,805,214 A | 9/1998 | Nishizawa et al. |
| 5,808,672 A | 9/1998 | Wakabayashi et al. |
| 5,815,201 A | 9/1998 | Hashimoto et al. |
| 5,828,986 A | 10/1998 | Horigome |
| 5,841,471 A | 11/1998 | Endsley et al. |
| 5,867,214 A | 2/1999 | Anderson et al. |
| 5,903,673 A | 5/1999 | Wang et al. |
| 5,907,359 A | 5/1999 | Watanabe |
| 5,917,549 A | 6/1999 | Simons et al. |
| 5,920,343 A | 7/1999 | Watanabe et al. |
| 5,982,946 A | 11/1999 | Murakami |
| 6,005,613 A | 12/1999 | Endsley |
| 6,009,201 A * | 12/1999 | Acharya ..................... 382/246 |
| 6,046,769 A | 4/2000 | Ikeda et al. |
| 6,055,066 A | 4/2000 | Kanda |
| 6,104,839 A * | 8/2000 | Cok et al. ................... 382/254 |
| 6,111,242 A | 8/2000 | Afghahi |
| 6,157,394 A | 12/2000 | Anderson et al. |
| 6,195,026 B1 * | 2/2001 | Acharya ..................... 341/60 |
| 6,195,469 B1 | 2/2001 | Nishioka et al. |
| 6,271,884 B1 * | 8/2001 | Chung et al. ............ 348/223.1 |
| 6,285,796 B1 * | 9/2001 | Acharya et al. ............ 382/246 |
| 6,381,357 B1 * | 4/2002 | Tan et al. ................... 348/246 |
| 6,446,155 B1 * | 9/2002 | Maggi et al. ............... 710/313 |
| 6,493,025 B1 | 12/2002 | Kiriyama et al. |
| 6,538,691 B1 | 3/2003 | Macy et al. |
| 6,580,828 B1 * | 6/2003 | Li ............................... 341/67 |
| 6,614,477 B1 | 9/2003 | Lee et al. |
| 6,625,318 B1 * | 9/2003 | Tan et al. ................... 348/131 |
| 6,833,862 B1 * | 12/2004 | Li .............................. 348/241 |
| 2003/0030729 A1 * | 2/2003 | Prentice et al. .......... 348/220.1 |

* cited by examiner

VIDEO CAMERA WITH MAJOR FUNCTIONS IMPLEMENTED IN HOST SOFTWARE

CROSS-REFERENCES TO RELATED APPLICATIONS

This application is a continuation-in-part of application Ser. No. 09/345,167, filed Jun. 30, 1999 now U.S. Pat. No. 6,833,862, entitled "IMAGE SENSOR BASED VIGNETTING CORRECTION", application Ser. No. 09/464,364, filed Dec. 15, 1999, entitled "DYNAMIC ANOMALOUS PIXEL DETECTION AND CORRECTION", and application Ser. No. 09/343,934 now U.S. Pat. No. 6,580,828, filed Jun. 30, 1999, entitled "FAST DECODING". All of which are incorporated herein by reference.

BACKGROUND OF THE INVENTION

The present invention relates to video cameras, and in particular to video cameras connected to a computer or other intelligent device by a shared interface, such as the universal serial bus (USB).

Video cameras for providing both still pictures and motion pictures have been developed which can connect to a computer to provide a digitized image. Such cameras can be connected to the computer via a shared bus, such as the USB. This limits the bandwidth of data that can be sent, requiring compression of the video data. Typically, cameras will do some of the preprocessing of the image in the camera electronics, thus both off-loading processing from the CPU of the computer and potentially reducing the amount of data that has to be compressed and sent over the bus.

With such a design, some functions are required to be done in the camera. For example, a CCD or CMOS sensor in the camera may have defective detector positions which do not properly collect light. These can be compensated for by averaging the amount of light detected at neighboring detector sites and substituting this for the value provided by the defective site. This type of processing needs to be done before other types of processing which are now typically done in a video camera, such as color processing and scaling.

FIG. 1 is a block diagram of a typical video camera which can connect over a bus to a host. A lens 10 focuses light onto a sensor 12 with associated control logic for reading out the sensor data. The data is provided to an analog-to-digital converter (ADC) 14, where it is digitized. The data is then stored in a frame buffer memory 16. Pixel correction can be applied to the data with a circuit 18. Correction data may be stored in a programmable memory 20. This memory may be programmed during the manufacturing process, before the camera is even shipped.

A number of other functions are typically performed in the camera, shown in FIG. 1 in a particular order, although they may be in other orders or connected via a bus to vary when they are invoked. For example, a color processing circuit 22 may perform a number of color functions, such as converting the received data from one color format, such as YUV, to another format, such as RGB. A scaler function 24 can scale the image to fit the display desired at the host. A compression circuit 26 will compress the data to reduce the amount of data to be transferred over the shared bus. Finally, a bus interface circuit 28 implements the protocols of a bus 30 for transferring data to a remote host.

Huffman coding is one of the algorithms most widely used to compress video data. Huffman coding has been used in various image and video compression standards such as the standards specified by the Joint Photographic Experts Group (JPEG), Motion Picture Experts Group (MPEG), MPEG-II, H.261, H.263, and H.323. These standards are included herein by reference, in there entirety and for all purposes. Huffman coding is a lossless entropy coding technique. Huffman coding utilizes probability to select the shortest code word for the data that occur most frequently. For example, when encoding English text, "E" which is a very popular character in the English language can be represented by a 2-bit code word, whereas "A" which is not used as frequently can be represented by an 8-bit code word.

As a result, Huffman coding compresses data by assigning shorter code words to more frequently occurring data and longer code words to less frequently occurring data. The assigned code words can be maintained in a table which is then used by both recipients and senders. Further details regarding Huffman encoding can be found in "A Method for the Construction of Minimum Redundancy Codes," *Proceedings of the IRE*, Vol. 40, No. 9, September 1952, pp. 1098–1101, by D. A. Huffman, which is incorporated herein by reference in its entirety and for all purposes.

Moreover, Huffman code words are constructed in such a way that no code word is the prefix of another code word. This assures the unambiguous decoding of each symbol from a bitstream of data despite the variable lengths of the codes. Additional description of the characteristics of Huffman codes can be found in Data Compression Book, M&T Books, 1996, by M. Nelson and J. L. Gailly, which is also incorporated herein by reference in its entirety and for all purposes. On pages 31–35, this reference proposes a decoding algorithm based on tree-tracing. This algorithm is, however, not suitable for fast decompression using most of the currently available microprocessors such as Intel®'s Pentium® family.

The vignetting effect is when the brightness around the edges of a screen is less than the brightness in the center of the screen, creating a halo effect. Professional photographers will sometimes try to intentionally create this effect with an appropriate lens or screen, to produce a softened image at the edges of a picture. However, when this effect appears unintentionally in digital photographs, it is annoying. A variety of techniques have been developed to measure and address vignetting effects.

U.S. Pat. No. 4,884,140 shows an analog circuit for providing vignetting compensation for a video camera using a zoom lens which causes vignetting.

U.S. Pat. No. 5,434,902 shows measuring the vignetting effect for an x-ray examination apparatus by using a constant brightness image. A correction factor is then stored in the memory for each pixel.

U.S. Pat. No. 5,576,797 shows the detection of vignetting effects in a camera with a focus detecting device.

U.S. Pat. No. 5,381,174 shows the correcting of vignetting due to operation of a zoom lens by using a field frequency sawtooth signal.

U.S. Pat. No. 4,816,663 shows the detection of vignetting between a photo taking lens and focus detecting optical system.

Digital cameras for use with a personal computer for personal teleconferencing have become cheaper and cheaper. This puts pressure on the camera manufacturers to use cheaper lenses, which have more of a vignetting effect. In addition, the price pressure forces manufacturers to use fewer semiconductor chips, thus making the use of semiconductor memory to store vignetting corrections undesirable. Accordingly, there is a need for a digital camera which is inexpensive to manufacture and also corrects for vignetting of an inexpensive lens.

The processes used to produce image sensors, though highly advanced, are not perfect. Photosites in an image sensor array can vary in their sensitivity or ability to convert light into electric currents. Some variation is expected and tolerable, but on occasion, individual photosites in an array can be dead, inactive or over active. This can result in a displayed image having a dark or black dot, bright white dot or incorrect color dot, all of which are unwanted and are undesirable to the end user. Those in the digital imaging field have also recognized the problems caused by improper digitization of target images and have proposed various solutions to detect and correct defective pixels. These prior art methods and systems can be broadly classified into two groups.

On one hand, there are various hardware-based methods for detecting and correcting defective pixels taken from an image sensor array. These hardware-based methods and systems are quite common to video camera manufacturers. Most conventional video cameras using a solid state image pickup device, incorporate a defective pixel detection and correction circuit for correcting defective pixels taken from an image sensor array. The defective pixels are produced when or after the image sensor array is manufactured. In such a camera, a defective pixel correction circuit detects a defective pixel and stores the position data and various data related to the defective pixel in a read only memory (ROM) or the like. Then, when the video camera is in use, pixel data from the defective pixel is replaced by data from a pixel near the defective pixel. One such method and system is disclosed in U.S. Pat. No. 5,796,430. The disadvantage of such approaches is the need to incorporate and program memory devices during product assembly and testing which add costs and delays. Additionally, the hardware device costs will also increase due to the need to add the correcting circuitry or logic to the video processing application specific integrated circuit (ASIC).

On the other hand, there are various software-based methods for detecting and correcting defective pixels in digital images. One such method and system is disclosed in U.S. Pat. No. 5,982,946. Such software-based methods are generally aimed at correcting bad image pixels in an already digitized and fully processed image. These already digitized images are in their final displayable and stored forms which have already been through color processing, compression and various other processing that are performed on the raw data which is read off an image sensor array. Therefore, such software-based methods which treat completely processed digital images, may correct anomalous pixels that are caused by any number of artifacts such as dust or dirt on the original scene, dust or dirt on the lens which was used to capture the scene as well as anomalous pixels in the digitized image which were caused by defective photosites. These methods typically rely on rather sophisticated and expensive systems and computer software to detect and correct bad pixels. These methods generally require user input to detect the location of the potentially bad image pixels. Once the user has visually scanned an entire image and flagged potentially bad image pixels, the system incorporating the software program takes over to correct the flagged defective pixels. Besides requiring user input, such approaches are also expensive, tedious and very time consuming.

The proliferation of inexpensive PC-interfacing digital still and video camera devices requires rapid, dynamic, inexpensive and intelligent defective pixel detection and correction solutions.

SUMMARY OF THE INVENTION

The present invention provides a low cost camera by implementing the major functions in host software. This is accomplished by sending raw, digitized data from the camera directly to the host. The increased volume of raw data is handled by either an improved compression/decompression scheme using lossless compression, using lossy compression or using a shared bus with higher bandwidth. By moving such functions as color processing and scaling to the host, the pixel correction can also be moved to the host. This in turn allows the elimination of the frame buffer memory from the camera. Finally, the camera can use a low cost lens by implementing vignetting correction with a vignetting correction value stored in a register of the camera for later access by the host to perform corrections.

In one embodiment, the host decompresses the transmitted data by using a processor with the capability of simultaneous operations on multiple packed pixel values, such as the Intel MMX™ technology. This maintains a sufficient decompression speed for a larger amount of data with minimal impact on the frame rate. In one embodiment, a group of bits from the data stream are duplicated and provided to multiple positions in a register, where they can be simultaneously compared to multiple maximum values. This allows a quick determination of how many bits of the variable bit encoding correspond to a pixel value.

In an embodiment using lossy compression, vignetting, gamma, distortion or aliasing correction and pixel correction are performed in the camera itself, since the ability to correct would be degraded by the loss of information during the lossy compression/decompression process. However, the color processing, scaling and other operations are still performed in the host, achieving a low cost camera which does not require a frame buffer memory and color processing and scaling circuitry.

In one embodiment, the camera can be made low-cost by using a low-cost lens even though it has vignetting distortion. This is accomplished by providing a memory element, such as a register, in the camera. This memory element is programmed at the time of manufacture with a value corresponding to the amount of vignetting or correction required. The register can then be read by the host during operation to determine the amount of correction required in a vignetting correction algorithm executed in the host on the received data prior to any other processing. In an alternate embodiment, the memory element can store a correction or value factor for other defects in the lens or other aspects of the camera. For example, an indication of bad pixel sites could be stored for subsequent reading and correction by the host.

For a further understanding of the nature and advantages of the invention, reference should be made to the following description taken in conjunction with the accompanying drawings.

DESCRIPTION OF THE SPECIFIC EMBODIMENTS

I. Overall System.

Figure 2:
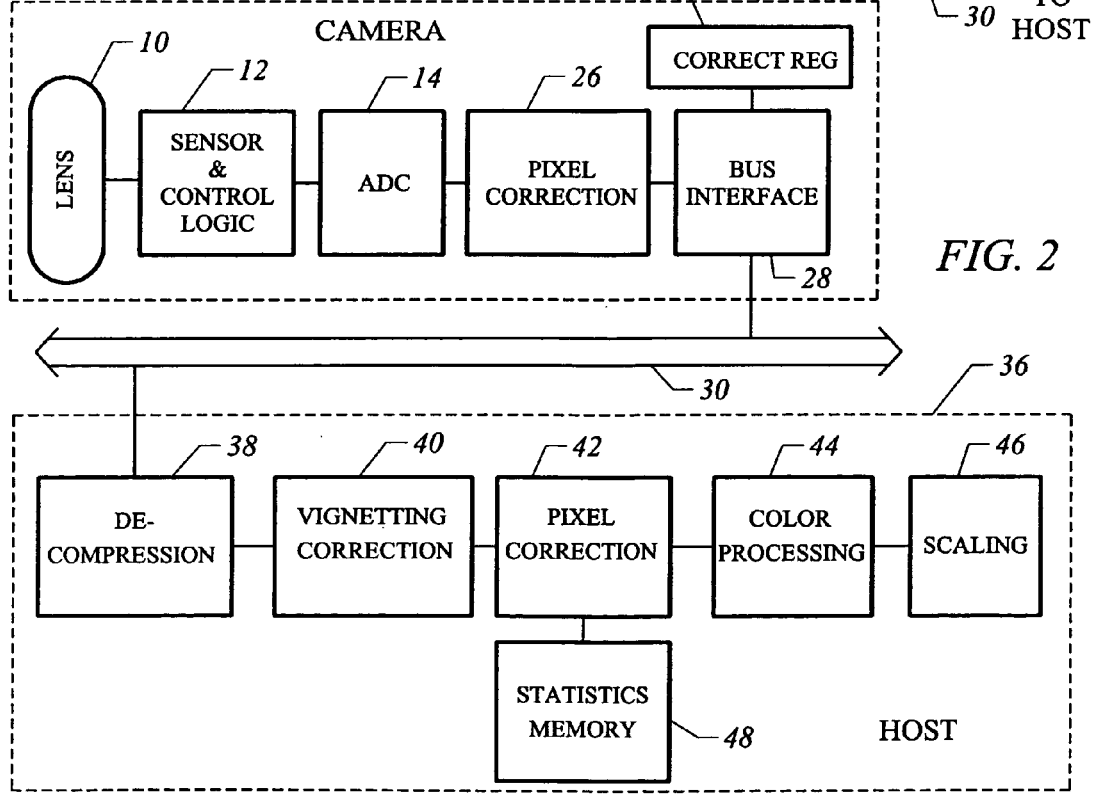
FIG. 2 is a block diagram of one embodiment of the invention with major functions moved to a host.

FIG. 2 is a block diagram of one embodiment of the invention. A camera 32 includes a lens 10, a sensor and control logic 12, and an ADC 14, as in the prior art. However, the other major functions are removed, except for a compression block 26 and bus interface 28. In addition, a correction register 34 is added to store a value corresponding to the vignetting of lens 10.

The camera connects over a shared bus 30 to host 36. In host 36, the blocks shown are programming blocks executed by the processor of host 36. These are a decompression block 38, a vignetting correction block 40, a pixel correction block 42, a color processing block 44 and a scaling block 46. Also shown is a statistics memory 48, which can be a portion of the host memory, for storing statistics information on pixels needing correction.

II. Huffman Decompression.

Preferably, the processor used by host 36 includes the ability to perform operations on multiple packed pixels in a single register in parallel. For example, the Intel MMX™ technology provides a number of instructions for such operations on packed pixels in the microprocessor registers. Accordingly, it is desirable to take advantage of such functions to increase the speed of processing. However, certain operations do not lend themselves to such simultaneous operation. For example, Huffman compression is often used for video data, and is used in the embodiment of this invention. This is a variable length code compression mechanism. In other words, the number of bits corresponding to a pixel value could be 1, 2, 3, 4, etc., and can vary from pixel to pixel. Without knowing the number of bits ahead of time, and with different sizes, it is not immediately obvious how to utilize a packed pixel register which uses the same size for each of the pixel representations.

At the limited bandwidth of today's USB technology, it is desirable to be able to somehow do parallel decompression processing if the camera is to send raw data, which will have a much larger amount of data than data which has been preprocessed. This is accomplished by uniquely using the packed pixel configuration to perform the Huffman decoding.

Figure 3:
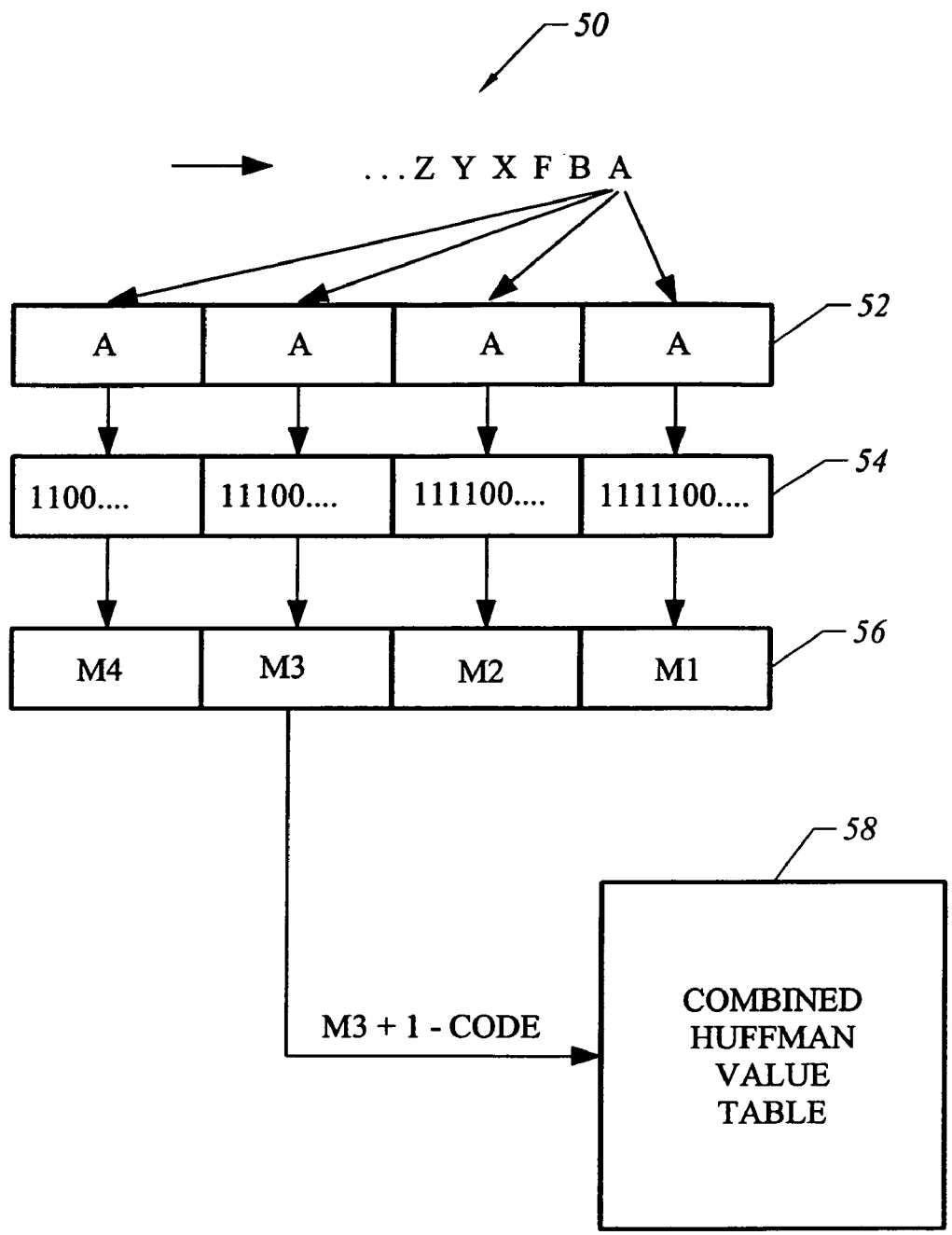
FIG. 3 is a diagram illustrating the operation of Huffman decoding operations in parallel.

FIG. 3 is a diagram illustrating in general how the parallel Huffman decoding proceeds. An incoming data stream 50 is illustrated by a number of letters. Each letter is an arbitrary symbol indicating a different number of bits. In the example shown, the first of number of bits, A, is duplicated four times and placed into four positions in a first register 52. A second register 54 stores four different masks. The masks enable a comparison with different portions of the bits in bit segment A. For example, the number of bits of A examined could be 1, 2, 3 and 4, respectively. These would then be compared to the maximum values for the Huffman codes for 1, 2, 3 and 4 bits. These four different maximum values are stored in another register 56. Thus, instead of sequentially comparing the number of bits A to four different values, this can be done in parallel, even though the number of bits to be compared is variable. This variation is overcome by using the masking operation. Thus, the same number of bits are stored in each pixel location in the register, but a different number of bits are compared for each of the pixel locations by virtue of the mask operation.

In the example shown, the bit segment A corresponds to being within the maximum segment M3, which is then used in an equation to index into a combined Huffman value table 58. By using the arithmetic result of the prior comparison as an index, what used to require three different table lookups in the prior art can now be done in a single table lookup, thus saving further processing time.

Figure 4:
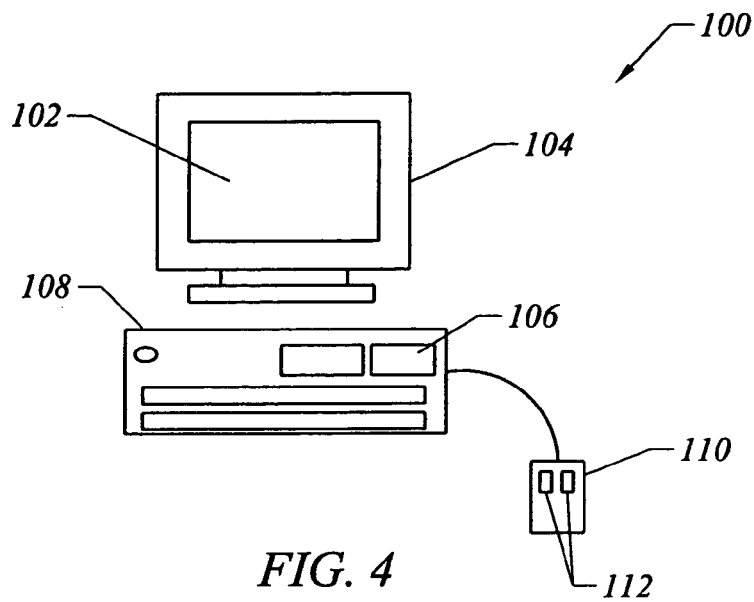
FIG. 4 illustrates an example of a computer system used to execute methods of embodiments of the present invention.

FIG. 4 illustrates an example of a computer system used to execute the software of the present invention. FIG. 4 shows a computer system 100 which includes a monitor 104, screen 102, cabinet 108, keyboard 214 (see FIG. 5), and mouse 110. The mouse 110 can have one or more buttons such as mouse buttons 112. The cabinet 108 can house a CD-ROM drive 106 and a hard drive (not shown) which can be utilized to store and retrieve software programs incorporating the present invention. Although the CD-ROM 106 is shown as removable media, other removable tangible media including floppy disks, tape drives, ZIP® drives, and flash memory can be utilized. The cabinet 108 can also house familiar computer components (not shown) such as a processor, memory, and the like.

Figure 1:
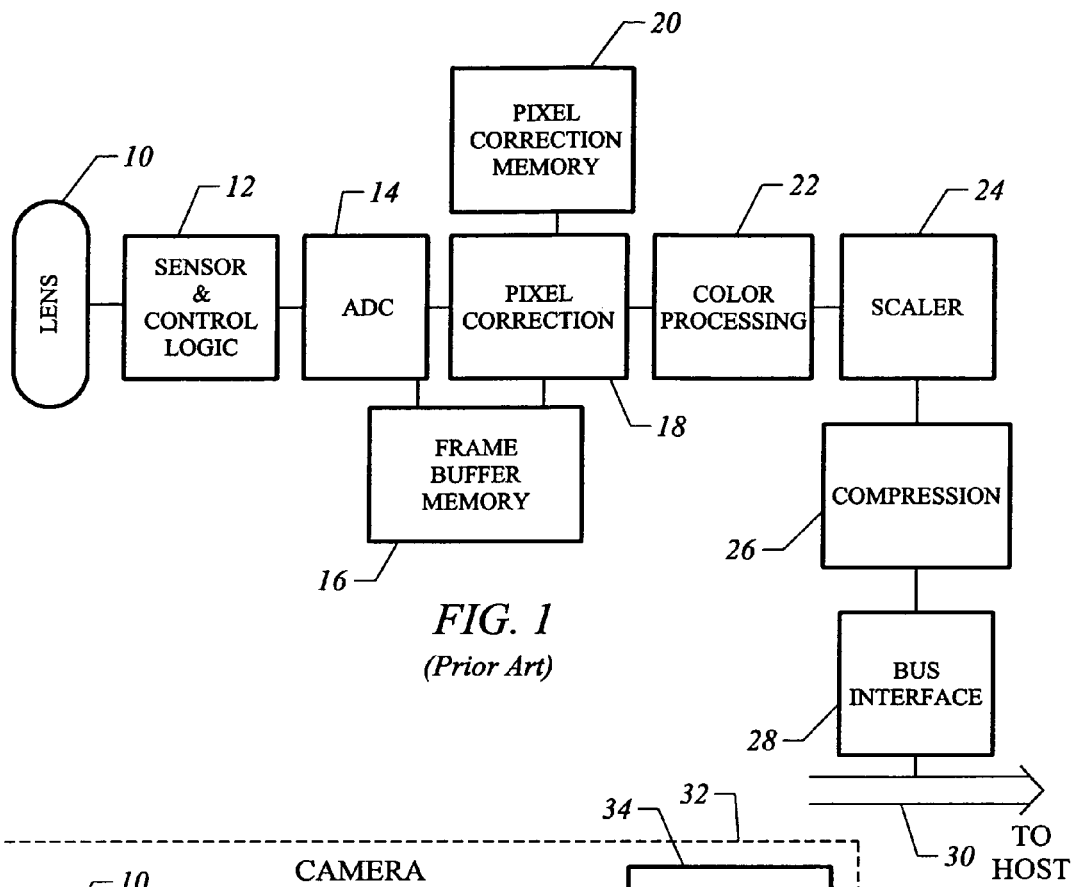
FIG. 1 is a block diagram of a prior art video camera.
Figure 5:
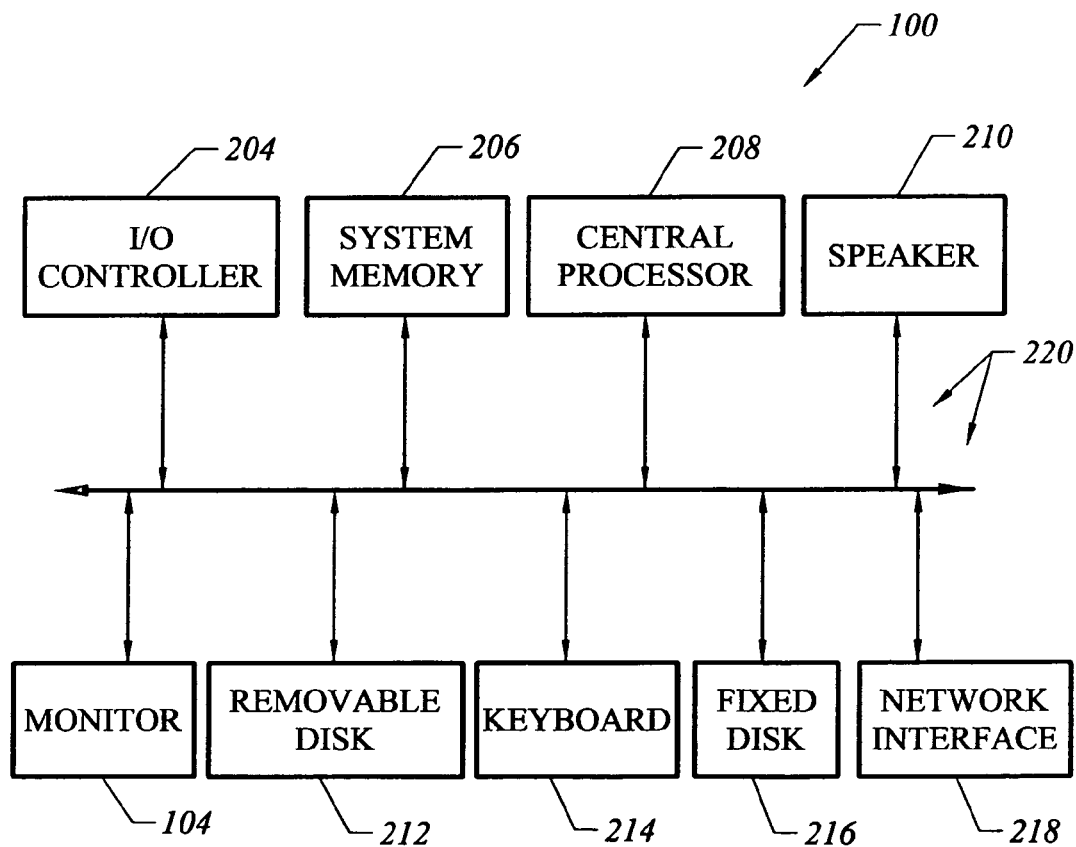
FIG. 5 illustrates a simplified system block diagram of a typical computer system 100 used to execute the methods of embodiments of the present invention.

FIG. 5 illustrates a simplified system block diagram of a typical computer system 100 used to execute the software of embodiments of the present invention. As shown in FIG. 1, the computer system 100 can include the monitor 104. The computer system 100 can further include subsystems such as I/O controller 204, system memory 206, central processor 208, speaker 210, removable disk 212, keyboard 214, fixed disk 216, and network interface 218. Other computer systems suitable for use with the present invention may include additional or fewer subsystems. For example, another computer system could include more than one processor 208 (i.e., a multi-processor system) or a cache memory. Arrows such as 220 represent system bus architecture of the computer system 100. However, these arrows 220 are illustrative of any interconnection scheme serving to link the subsystems.

For example, a local bus could be utilized to connect the central processor 208 to the system memory 206. Also, an image capture device such as a charge-coupled device (CCD) camera can be connected to the computer system 100 for capturing image data. The image capture device can be connected to the computer system 100 via the same or another bus architecture such as a Universal Serial Bus (USB) and the like. USB can provide plug and play support for more than 100 connected peripherals by using an identification number which is matched against a database of device drivers. The USB can also be connected to the computer system 100 through the I/O controller 204 or the network interface 218. Additionally, the computer system 100 can be configured to communicate with the Internet via, for example, the I/O controller 204 or the network interface 218. Accordingly, data can be transmitted to and from the computer system 100 by a variety of devices. The computer system 100 shown in FIG. 4 is but an example of a computer system suitable for use with the present invention. Other configurations of subsystems suitable for use with the present invention will be readily apparent to one of ordinary skill in the art.

The present invention can be embodied in any microprocessor capable of single instruction multiple data (SIMD) execution. For example, the Intel® MMX™ microprocessors, the Sun® UltraSPARC® with Visual Instructions Set, Advance Micro Device, Inc.'s® 3DNow!™, Intel® MMX™ with streaming SIMD extensions, and the like can be utilized. For the sake of example, an implementation using the Intel® MMX™ will be described. The MMX™ technology was formally introduced in January 1997 to accelerate the CPU demanding multimedia applications. The MMX™ technology provides a set of instructions (57 instructions) introduced by Intel® Corporation. It can perform addition, subtraction, multiplication, logic, and arithmetic shifts on a unit of 64 bits in the same instruction. The unit of 64 bits can also be treated as 8 bytes, 4 words, 2 double words, or 1 quad word. Instructions for saturation arithmetic and packing/unpacking data are provided as well as those which transfer data between MMX™ registers and integer registers. Further information regarding MMX™ technology can be found in "Introduction to the Intel® Architecture MMX™ Technology Developer's Manual," Intel® (1996), which is incorporated herein by reference in its entirety and for all purposes.

Figure 6:
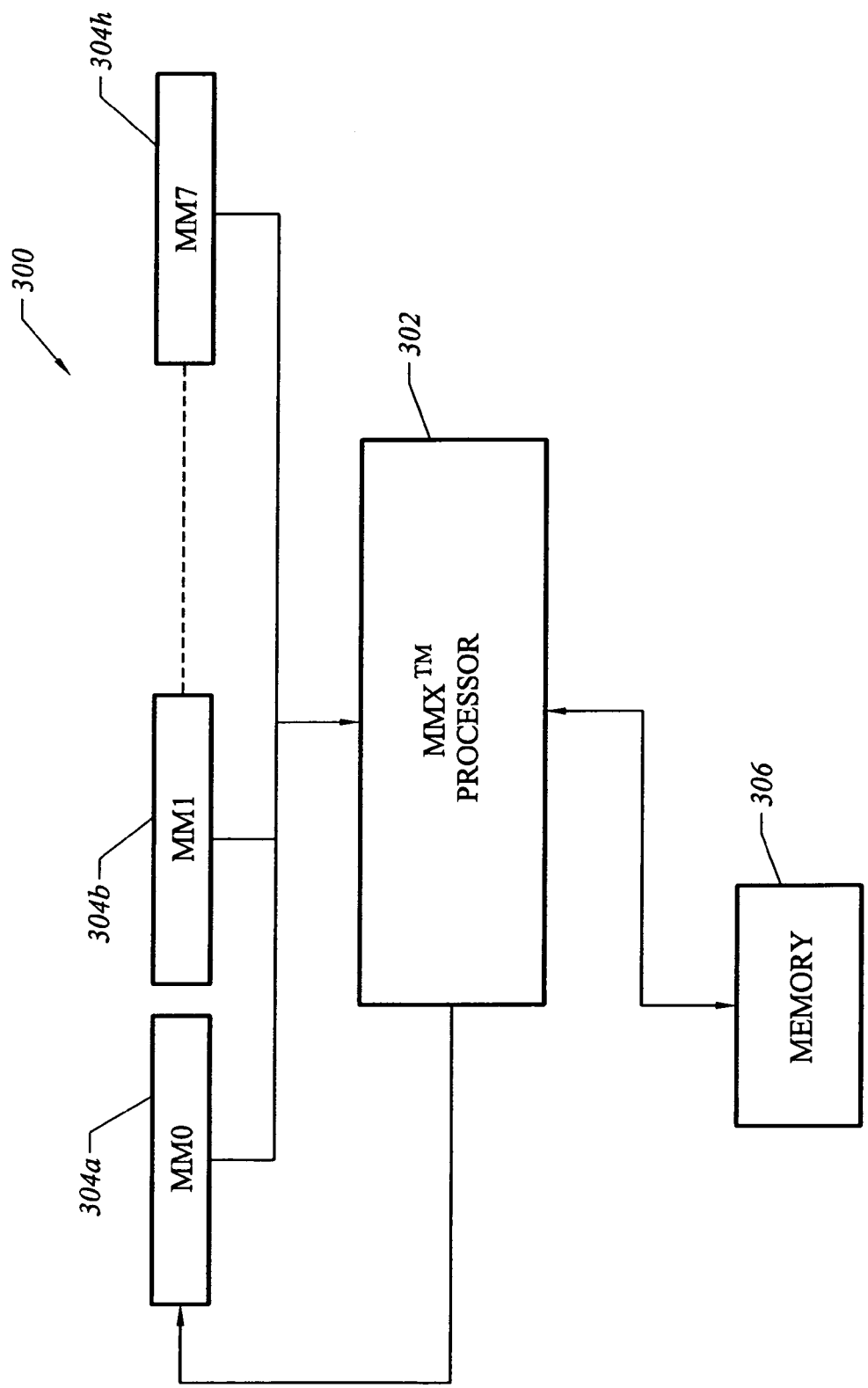
FIG. 6 is a simplified block diagram of a SIMD system 300 in accordance with an embodiment of the present invention.

FIG. 6 is a simplified block diagram of a SIMD system 300. The system 300 includes an MMX™ processor 302 which presently supports a set of 57 instructions. The MMX™ processor can be implemented within a CPU or can be alternatively implemented in a separate chip. The MMX™ processor 302 receives data from registers 304a–h. Each of the registers 304a–h are 64 bits wide. Each of these registers can hold 8×8, 16×4, 32×2, 64×1 bits of data. The MMX™ processor 302 receives the data from the registers 304a–h and performs the required operations on the data in one cycle. The processed data is then either provided to a memory 306 or back to registers 304a–h. The memory 306 can be implemented within the MMX™ processor 302 or it can alternatively be shared memory. As a result, the MMX™ processor 302 can perform the same operations on different data at the same time, hence it has an SIMD architecture.

Figure 7:
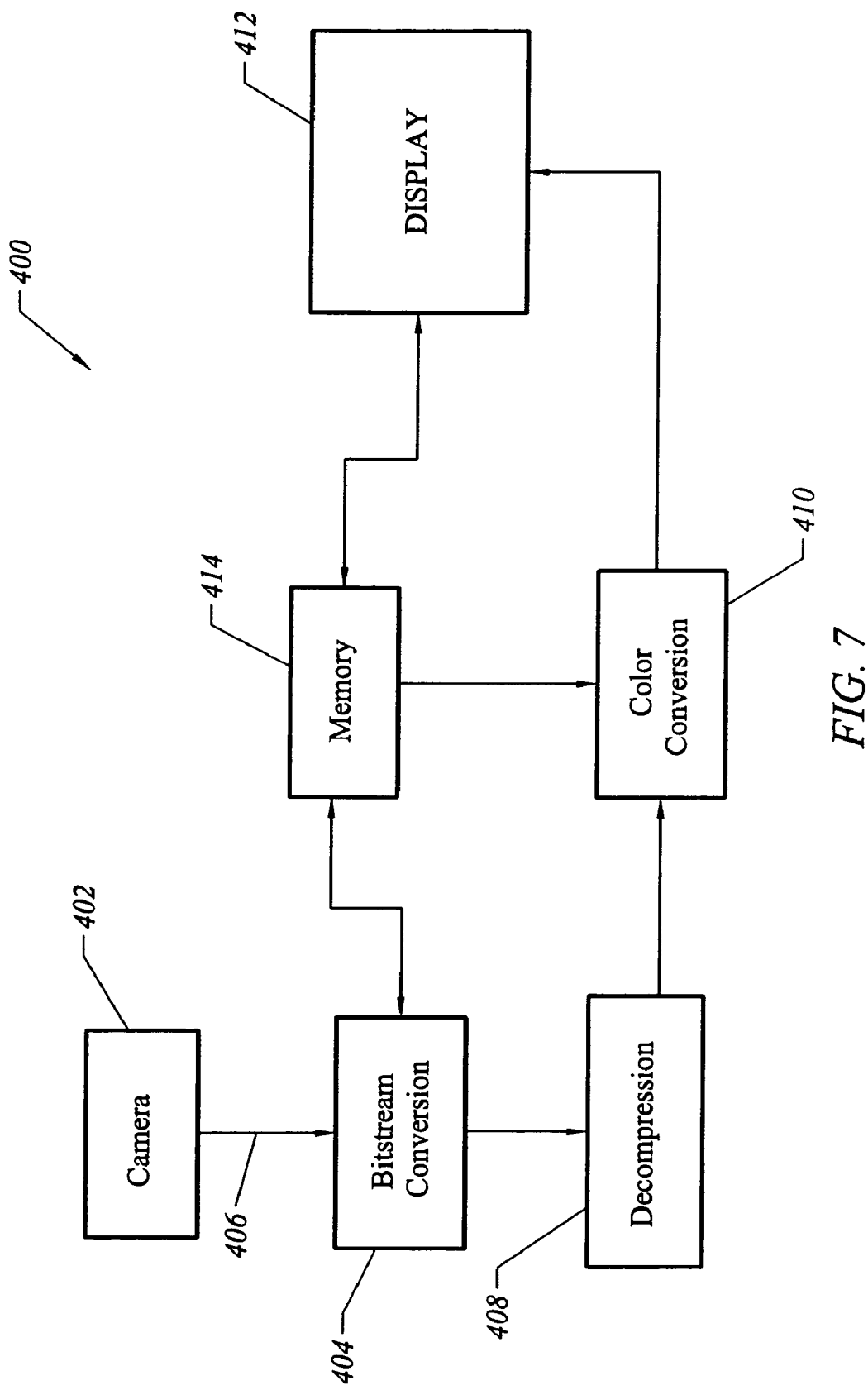
FIG. 7 illustrates a simplified block diagram of a system 400 in accordance with an embodiment of the present invention.

FIG. 7 illustrates a simplified block diagram of a system 400 using the USB. A camera 402 captures images and provides them to a bitstream conversion block 404. The camera 402 can include circuitry for conversion of analog data to digital data. The camera 402 can also include circuitry to perform data compression and/or encoding. The camera 402 and the bitstream conversion block 404 are connected via connector 406. The connector 406 can be selected from a number of connectors or bus architectures which are well known to those with ordinary skill in the art. The connector 406 is preferably a USB connection. In some implementations, USB provides a 12 Mb/sec bandwidth. Another choice for connector 406 can be Firewire (IEEE 1394) which can provide a bandwidth of 100 Mb/sec, 200, 400, or 800 Mb/sec. A USB connection is preferred for some embodiments because it is a powered bus which currently provides up to 500 mA and 5 V. The power provided by USB can be utilized to run the devices connected to the bus, such as the camera 402. Additionally, USB is less costly to implement. In some embodiments, since USB does not have the same bandwidth as Firewire, USB can be utilized where the data is first compressed prior to transmission on the USB.

Accordingly, the camera 402 can include compression circuitry to compress the captured images before sending the data to the bitstream conversion block 404. The camera 402 can be any number of devices for capturing images including a CCD, complementary metal oxide semiconductor (CMOS), and the like. The bitstream conversion block 404 can be configured to convert serially transmitted data into packets of data. For example, the bitstream conversion block 404 can accumulate data for each image frame and send the accumulated data to a decompression block 408. The frame of data can be any size, but is preferably 352×288 pixels. The frame can also be a block of 320×240, 176×144, or 160×120 pixels. In some embodiments, the frame of data can be a block of 640×480 pixels. The decompression block 408 decompresses and/or decodes the data received from the bitstream conversion block 404. The decoding can be in accordance with Huffman coding, arithmetic coding, other types of entropy coding, and the like. The bitstream conversion block 404 can also include buffers for storage of the data received from the camera 402 and the data sent to the decompression block 408.

The decompressed data from the decompression block 408 is then provided to a color conversion block 410. The data from the decompression block 408 can be in any format but is preferably in YUV format, where Y is luminance, U is chrominance red (also known as CR), and V is chrominance blue (also known as CB). The conversion block 410 converts the YUV format data to a format suitable for a display 412, including RBG (red, green, and blue). The display 412 can be any output device including a printer, a handheld device, and the like. The system 400 also includes a memory 414 which can provide storage for the display 412, the color conversion block 410, and the bitstream conversion block 404. The memory 414 can be any type of storage such as dynamic random access memory (DRAM), extended output DRAM (EDO DRAM), synchronous DRAM (SDRAM), video ram (VRAM), static ram (SRAM), and the like. Alternatively, the bitstream conversion block 404, the color conversion block 410, and the display 412 can have their own local memory. Also, the decompression block 408 can have its own storage or use the memory 414 for its storage when needed.

Figure 8:
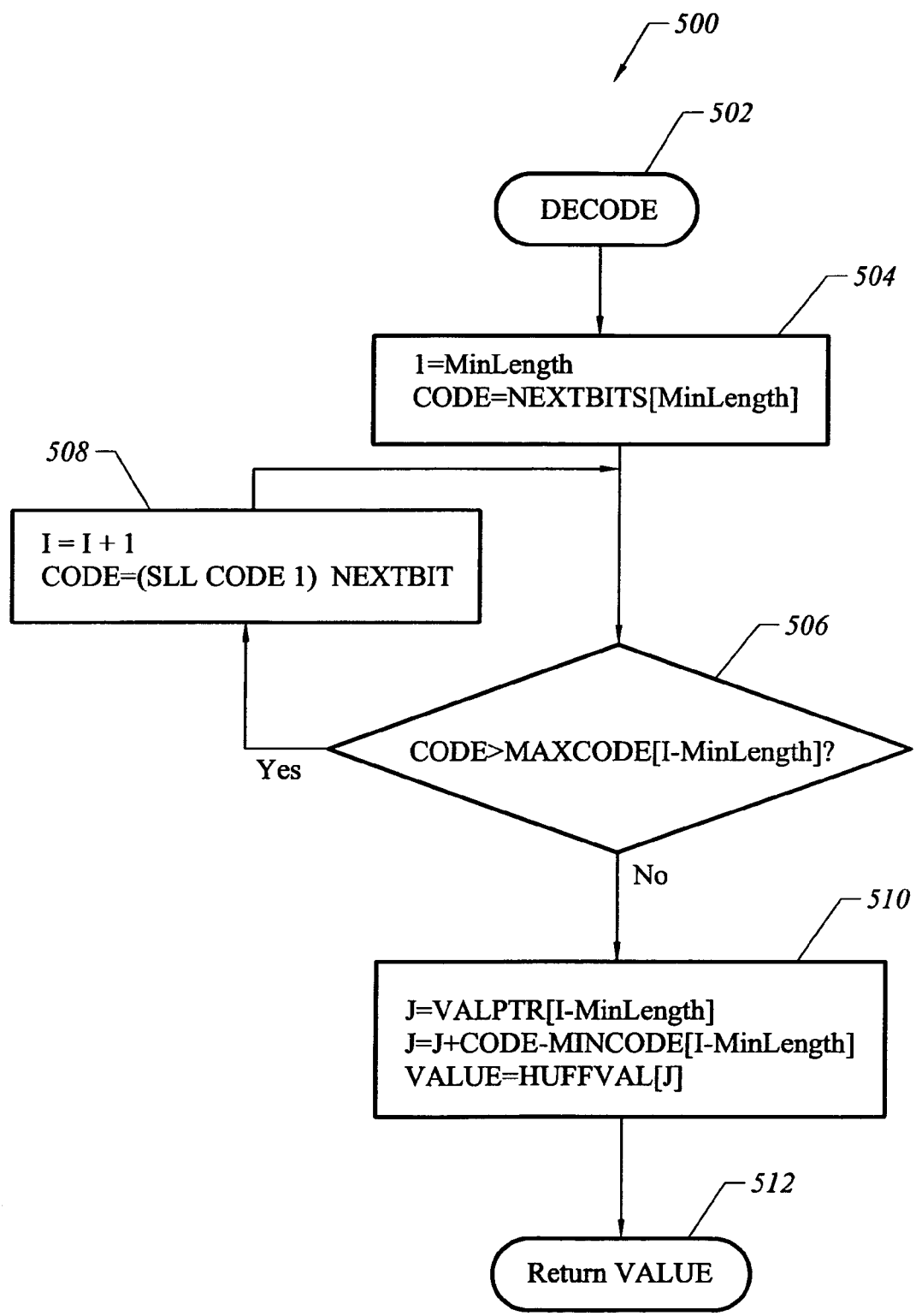
FIG. 8 illustrates a sequential decoding method 500 for decoding Huffman encoded data in accordance with an embodiment of the present invention.

FIG. 8 illustrates a sequential decoding method 500 for decoding Huffman encoded data. The sequential decoding method 500 uses the following four tables to produce the decoded value:

MINCODE[I]—minimum value of code words with length I;

MAXCODE[I]—maximum value of code words with length I;

HUFFVAL[J]—table of symbol values corresponding to the $j^{th}$ code word; and

VALPTR[I]—the index to the start of the list of values in HUFFVAL which are decoded by code words of length I.

The minimum length of all code words is MinLength and the maximum length of all code words is MaxLength. Hence, the size of tables MINCODE, MAXCODE, and VALPTR is equal to [MaxLength−MinLength+1]. The size of HUFFVAL depends on the number of code words, and is denoted as N. The three tables MINCODE, MAXCODE, and VALPTR are used to decode a pointer to the HUFFVAL table for each valid Huffman code.

In a step 502, bitstream data is received for decoding. In a step 504, a current code length I is set to MinLength. Step 504 also initializes a variable CODE to NEXTBITS[MinLength] which contains the code words from the bitstream provided by the step 502. A step 506 compares the value of CODE to MAXCODE[I]. If the value of CODE is greater than the value of MAXCODE[I], it is indicated that the current code word has a length larger than I, which was first initialized to MinLength in step 504, and the step 506 is followed by a step 508. In the step 508, the value of I is incremented by one. The step 508 also reads the next bit of the bitstream into CODE. The step 508 updates the value of CODE by performing a shift logic left (SLL) on current value of CODE by one bit, and filling the least significant bit of CODE with the next bit from the bitstream (NEXTBIT).

On the other hand, if in the step 506, it is determined that the value of CODE is not greater than the value of MAXCODE[I], it is indicated that the current code word has a length equal to or less than I, and the step 506 is followed by a step 510. The step 510 decodes the symbol value. The step 510 computes a code value pointer J and then uses J to compute the symbol value. The step 510 sets J to {VALPTR[I−MinLength]+CODE−MINCODE[I−MinLength]}. The step 510 then computes the symbol value by setting VALUE to HUFFVAL[J]. Accordingly, the step 510 performs three table look-ups, including VALPTR, MINCODE, and HUFFVAL, to compute the symbol value. The calculated symbol value (VALUE) is then provided to a step 512 to be output. The sequential decoding method 500 is repeated for the next code word.

The Huffman table used for encoding and decoding can be customized for each implementation. But, most coding standards provide a default Huffman table. Table 1 below illustrates a recommended Huffman table for luminance DC difference in accordance with the JPEG standard. Further information regarding the JPEG standard can be found in "JPEG—Still Image Data Compression Standard," Appendix A. ISO DIS 10918-1, Requirements and Guidelines, pp. F-26, Van Nostrand Reinhold, 1993, by William B. Pennebaker and Joan L. Mitchell, which is incorporated herein by reference, in its entirety and for all purposes.

In the JPEG standard, MinLength is 2 and MaxLength is 16. Code words are further sorted to be grouped in length and in ascending value order in each length group. The values in MINCODE and MAXCODE are signed 16 bit integers.

TABLE 1

| HuffValue | CodeLength | CodeWord | HuffCode |
|---|---|---|---|
| 0 | 2 | 00 | 0 |
| 1 | 3 | 010 | 2 |
| 2 | 3 | 011 | 3 |
| 3 | 3 | 100 | 4 |
| 4 | 3 | 101 | 5 |
| 5 | 3 | 110 | 6 |
| 6 | 4 | 1110 | 14 |
| 7 | 5 | 11110 | 30 |
| 8 | 6 | 111110 | 62 |
| 9 | 7 | 1111110 | 126 |
| 10 | 8 | 11111110 | 254 |
| 11 | 9 | 111111110 | 510 |

In Table 1, CodeWord represents the actual code words from the bitstream; CodeLength is the length of each code word; HuffCode is the value of each CodeWord; and HuffValue is the Huffman code for each symbol.

Taking the values from Table 1 as an example, with MinLength=2 and MaxLength=9, the table values of the three tables utilized by the sequential decoding method 500 are as follows:

MINCODE[8]={0, 2, 14, 30, 62, 126, 254, 510};
MAXCODE[8]={0, 6, 14, 30, 62, 126, 254, 510}; and
VALPTR[8]={0, 1,6,7, 8,9, 10, 11}.

For example, considering an incoming bitstream "010," the step 504 will set I to 2 and CODE to "01." The step 506 will return YES because "01" is greater than MAXCODE[2-2] which is 0. In the step 508, I is incremented to 3 and CODE is set to "010." The step 506 is repeated again and this time it will return NO because "010" is less than MAXCODE[3-2] which is 6. Then, the step 510 will set J equal to 1. The step 510 also looks up the symbol value for HUFFVAL[1] and outputs this symbol value (VALUE) in the step 512.

Accordingly, the sequential method 500 repeatedly shifts the bitstream into CODE and compares the current code with the maximum code of the same length. Once code length is known, the decoding of each value needs two additions and three table look-ups. This algorithm is sequential in nature because code lengths are checked sequentially. That is, before checking length I, there is no indication of whether the actual code length will be I,I+1, I+2, etc.

Figure 9:
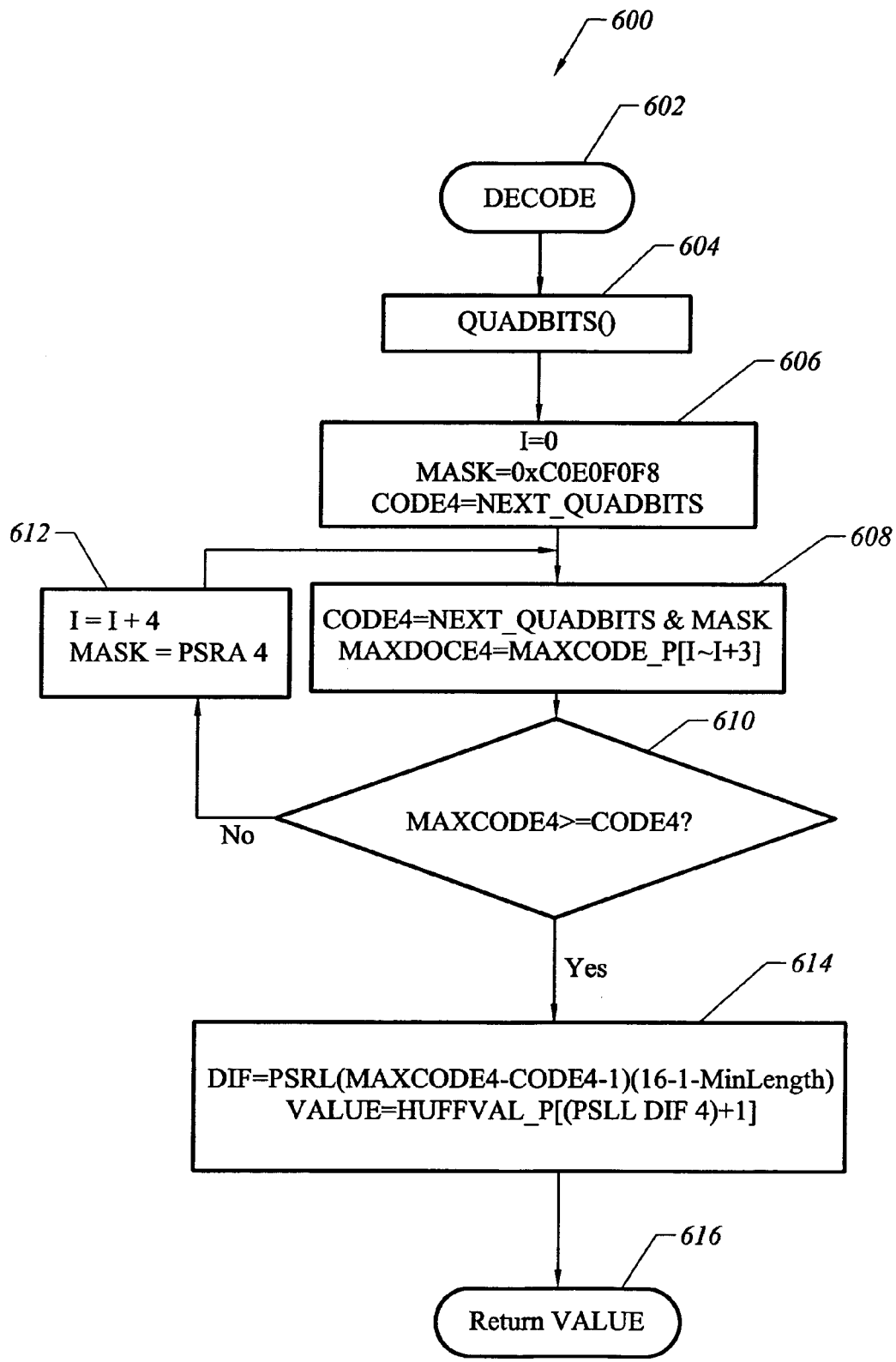
FIG. 9 illustrates a parallel decoding method 600 for decoding Huffman encoded data in accordance with another embodiment of the present invention.

FIG. 9 illustrates a parallel decoding method 600 for decoding Huffman encoded data in accordance with an embodiment of the present invention. For the sake of example, an implementation of the parallel decoding method 600, such as discussed with respect to FIG. 6, will be described. Also, sample JPEG values discussed with respect to FIG. 8 and Table 1 are utilized in the sample embodiment. The parallel decoding method 600 can, however, be performed on any processor capable of SIMD executions including Intel® MMX™ microprocessors, the Sun® UltraSPARC® with Visual Instructions Set, Advance Micro Device, Inc.'s® 3DNow!™, Intel® MMX™ with streaming SIMD extensions, and the like.

As detailed above, MMX™ technology can perform operations on a unit of 64 bits in the same instruction. The unit of 64 bits can also be treated as 8 bytes, 4 words, 2 double words, or 1 quad word. For the example in accordance with values from Table 1, the 64 bits can be treated as four 16-bit registers (or 4 words) because the maximum code word length in Table 1 is 9. For the example embodiment of FIG. 9, the MMX™ instructions PSRL, PSLL, and PSRA are utilized to shift the contents of selected variables.

PSRL denotes pack shift right logic. PSLL denotes packed shift left logical and PSRA denotes packed shift right arithmetic.

The parallel decoding method 600 receives the bitstream in a step 602. In a step 604, the bitstream is arranged in 4-bit portions (or quadbits) with little-endian format. This means if the original bitstream is of the form b0,b1,b2,b3, . . . (where bi stands for byte i), then the converted bitstream will be of form: b1,b0,b1,b0,b1,b0,b1, b0, b3,b2,b3, b2,b3,b2, b3,b2, b3,b2, . . . .

This conversion can be implemented using 5.5 cycles for each 16-bit word. In a step 606, values of I, MASK, and CODE4 are initialized. As discussed above for the JPEG example, I is initialized to 2. The step 606 initializes CODE4 to the first set of 4×16-bit codes (or quadbits) from the bitstream. The parallel decoding method 600 uses MASK to mask out the bits for a comparison operation in a step 608. The initial value for MASK is set to "1100,0000,0000,0000, 1110,0000,0000,0000,1111,0000,0000,0000, 1111, 1000,0000,0000 b" or "0xC000,E000,F000,F800." This is the bit mask for code lengths 2 through 5 which will be checked in the first iteration of the parallel decoding method 600.

In a step 608, CODE4 is masked off by the value of MASK. The step 608 also sets MAXCODE4 to MAXCODE4_P[I~I+3] which represents values of MAXCODE4_P for I, I+1, I+2, and I+3. Accordingly, MAXCODE4 will hold the maximum values for the four successive code lengths. Because the four values for MAXCODE4 will be loaded in one single instruction, the MAXCODE table for the parallel decoding method 600 can be generated as follows:

---

I = 0
while I is less than (MaxLength−MinLength+2) do
    J = (I/4)*4 + 3 − I%4
    MAXCODE_P[I] = $(2^{(16-\text{MinLength}-J)}*\text{MAXCODE}[J]) + 1$
    I = I + 1
end while

--- where "/" denotes division by truncation and "%" denotes modulo operation. The values of MAXCODE_P are unsigned 16-bit integers. The MAXCODE table only has to be generated once for each Huffman table.

Taking the same example as in the sequential Huffman decoding algorithm discussed with respect to FIG. 8, the MAXCODE table for the parallel algorithm will have the following values:

MAXCODE_P[8]={61441, 57345, 49153, 1, 65281, 65025, 64513, 63489}

For this example, the dimension of this table must be a multiple of 4. Also, zero is assumed for those code lengths that do not exist in the Huffman code table.

In a step 610, the value of MAXCODE4 is compared with CODE4 which was initialized and masked in the steps 606 and 608. In the embodiments which use the MMX™ technology, since the MMX™ instruction PCMPEQ compares only signed words, this comparison operation can be performed by one unsigned substraction with saturation and one comparison with zero. The values of MAXCODE+1 can be stored in MAXCODE4. If CODE4 is found to be greater than MAXCODE4, then in a step 612, I is incremented by 4 and the MASK is updated by shifting its value right arithmetically by 4 bits. The new value of MASK will create the bit mask for the next remaining 4 code word lengths (6 through 9). After the step 612, the steps 608 and 610 are repeated. Accordingly, for the example of Table 1, the steps 608 and 610 are repeated twice, once for code word lengths 2 through 5 and once for code word lengths 6 through 9.

Once the step 610 returns a YES, a step 614 determines which one of the four lengths being checked contains the symbol. Accordingly, the step 614 computes a value of DIF which is set to [MAXCODE4−CODE4−1] shifted logically right by 4 bits. The step 610 also performs a table look-up to provide the found symbol value (VALUE). The step 614 looks up the symbol value (VALUE) in a table HUFFVAL_P.

For this example, assuming 1<I<17, a HUFFVAL_P table can be created using [I+16*(MAXCODE[I]−CODE)] as index. Let:

M=max(MAXCODE[I]−MINCODE[I]); and
I=0,1,2, . . . , MaxLength−MinLength.

The HUFFVAL_P table will have a size of [16*(M+2)]. Let COENUM[I] denote the number of code words whose code length is (I+MinLength). Let CODE[J] denotes the code value of the $J^{th}$ code with code length I. The entries of the large HUFFVAL table can be computed as follows:

---

I = 0
while I is less than (MaxLength−MinLength+1) do
    J = 0
    while J is less than CODENUM[I] do
        HUFFVAL_P[I+16*(MAXCODE[I]+1−CODE[J])] =
            HUFFVAL[VALPTR[I]+CODE[J]−MINCODE[I]]
        J = J + 1
    end while
    I = I + 1
end while

---

Accordingly, values in the HUFFVAL_P table will be the maximum size of unsigned 16-bit integers depending on the number of the Huffman codes. By combining the three table look-ups of the sequential method into one, the instructions needed to index a Huffman code value is significantly reduced. At the same time, reducing the number of table look-ups saves valuable register space. Also, note that (MAXCODE[I]+1−CODE) was computed when determining the code length and is available for this table look-up.

In a step 616, the calculated symbol value (VALUE) is output. Once the code length of current Huffman code is determined in the step 614, the current 4×16-bit code word can be left shifted and the same number of bits from the next 4×16-bit code word can be shifted in. The decoding of next Huffman code can then be started.

Accordingly, the parallel decoding method 600 reads in 4 bits of data at a time from the bitstream. Each consecutive 4-bit lengths are checked in parallel to see if the current code word falls in that range. Instead of the required 16 checks to cover the range 1 through 16 in the sequential algorithm, only 4 checks are needed to cover the same range. Another significant improvement is to combine the three table look-ups for decoding into one single table look-up. This has the effect of minimizing computations as well as register usage, which can be very valuable in many situations.

Sample Embodiment for Lengths 1 Through 8

The example embodiment discussed above assumes that the code words have lengths between 2 and 9. If, however, the code words have lengths between 1 and 8, the decoding can be done on units of 8 bits. A maximum of one check instead of 8 is needed for each code word. This requires that the bitstream be expanded into 8×8 bits. For example, if the input bitstream is "b0,b1, . . . " (where bi stands for byte i), the converted bitstream will be "b0,b0,b0,b0,b0,b0,b0,b0, b1,b1,b1, b1,b1,b1,b1,b1, . . . " The initial bit mask will now be "10000000,11000000,11100000, 11110000,11111000,11111100,11111110,11111111 b" or "0x80C0,E0F8,F8FC,FEFF."

The table entries will be generated as follows:

```
I = 0
while I is less than (MaxLength-MinLength+1) do
        J = (I/8)*8 + 7 - I%8
        MAXCODE_P[I] = (2^(8-MinLength-I)*MAXCODE[J]) + 1
        I = I + 1
end while
I = 1
while I is less than 9 do
        J = 0
        while J is less than CODENUM[I] do
                HUFFVAL_P[I+8*(MAXCODE[I]+1-CODE[J])] =
                        HUFFVAL[VALPTR[I]+CODE[J]-MINCODE[I]]
                J = J + 1
        end while
        I = I + 1
end while
```

The values for HUFFVAL_P table will be unsigned 8-bit integers. The values for MAXCODE_P table will be unsigned 8-bit integers.

Sample Embodiment for Lengths 1 Through 32

If the length of code words are between 1 and 32, the decoding can be done on units of 32 bits. A maximum of 8 checks instead of 16 checks will be needed to determine the length of a code word. The bitstream will be extended into 2×32 bit form as follows:

Input bitstream: b0,b1,b2,b3,b4,b5,b6,b7, . . .

Output bitstream: b3,b2,b1,b0,b3,b2,b1,b0,b7,b6,b5,b4, b7,b6,b5,b4, . . .

The initial bit mask will now be "10000000,00000000, 00000000, 00000000,11000000,00000000,00000000,00000000,00000000 b" or "0x8000,0000, C000,0000."

The table entries will also be computed as follows:

```
I = 0
while I is less than 32 do
        J = (I/2)*2 + 1 - I%8
        MAXCODE_P[I] = (2^(32-MinLength-I)*MAXCODE[J]) + 1
        I = I + 1
end while
I = 1
while I is less than 32 do
        J = 0
        while J is less than CODENUM[I] do
                HUFFVAL_P[I+32*(MAXCODE[I]+1-CODE[J])] =
                        HUFFVAL[VALPTR[I]+CODE[J]-MINCODE[I]]
                J = J + 1
        end while
        I = I + 1
end while
```

Thus, the values for MAXCODE_P table will be unsigned 32-bit integers. Values of table HUFFVAL_P will be the maximum size of unsigned 32-bit integers.

Performance Evaluation

The proposed parallel Huffman decoding algorithm has been implemented in MMX™ assembly code. For this section, the CPU time to expand the original bitstream into 4×16-bit portions is included in the decoding time.

If code words of length I appear with a probability of $2^{-I}$, then the probability that a code word is of length I will be $CODENUM[I]*2^{-I}$. Letting $T[I]$ be the time to decode a code word of length I, then the average decoding time for one symbol can be calculated as follows:

$$\overline{T} = \sum_{I=2}^{16} \frac{CODENUM[I]*T[I]}{2^I}$$

Assuming the compression of ten common intermediate format (CIF) pictures using a sequential algorithm and where only one-fourth of the discrete cosine transform (DCT) coefficients are coded using the RUN-LEVEL symbols, the number of Huffman code words to be decoded can be calculated as follows:

(352*288/4)*10=253,440

Even though DCT is selected for this example, it would be obvious to those with ordinary skill in the art to utilize any transforms such as differential parse code modulation (DPCM), wavelet, sub-band transform, vector quantization, and the like. Using a 166 MHz Intel® Pentium® processor with MMX™, the decompression timing for the best case (where all code words are 2 through 5 bits long), worst case (where all code words are 12 through 15 bits long), and average case (where code lengths are distributed between 2 through 16 bits) are shown in Table 2 below.

TABLE 2

| Decoding Time (in msec) | Parallel Huffman Decoding |
| --- | --- |
| best case | 111 |
| average case | 113 |
| worst case | 218 |

Table 2 demonstrates that the parallel algorithm significantly reduces the worst case timing while giving superior performance for the average case. Also, note that even better results may be achieved by optimizing the assembly code further.

As will be understood by those with ordinary skill in the art, the present invention may be embodied in other specific forms without departing from the spirit or essential characteristics thereof. For example, the techniques of the present invention can also be applied to other SIMD systems such as the Sun® UltraSPARC® with Visual Instructions Set, Advance Micro Device, Inc.'s® 3DNow!™, and the like can be utilized.

Also, Intel®'s new Pentium® III (also know as Katmai), the successor of Pentium® II adds streaming SIMD extensions. Pentium® III provides 70 new instructions. Many instructions are for floating point SIMD operations which are targeted at 3-D applications. Several instructions for fixed point number operations have also been added. These instructions are, in part, targeted at the MPEG encoding/decoding (motion estimation, motion compensation). Those with ordinary skill in the art would, however, understand that these new instructions can be taken advantage of to further accelerate the decoding techniques of the present invention. For example, Min and Max operations can speed up the code length detection. Insertion instruction to transfer integer registers and part of MMX™ registers also provides speed-up. Similarly, broadcast instruction can duplicate the bitstream in a more efficient manner.

Alternately, the techniques of the present invention can be implemented in a computer system. For example, the methods 500 and 600 can be implemented on a peripheral component interconnect (PCI) card. The PCI card can be installed onto the PCI bus of a personal computer. Also, other bus technologies such as NUBUS, ISA, EISA, Universal Serial Bus (USB), 1394 Firewire, and Accelerated Graphics Port (AGP) can also be utilized. Moreover, the techniques of the present invention can be implemented by utilizing the available routines and features such as caching, new instruction sets, multi processor systems, and their equivalents.

III. Vignetting Correction.

Register 34 of FIG. 2 allows a vignetting correction to be applied, thus allowing a cheaper lens 10 to be used in camera 32. This allows the cost of the camera to be driven even lower.

In operation, the processor in host 36 will interrogate the camera to read the value of register 34. This will then be used in the vignetting correction block 40 of the host to correct for vignetting defects of the camera. This is done prior to pixel correction of block 42, to avoid vignetting being mistaken as a defective pixel. The correction can be accomplished by adding an offset value to the pixel brightness value provided.

Figure 10:
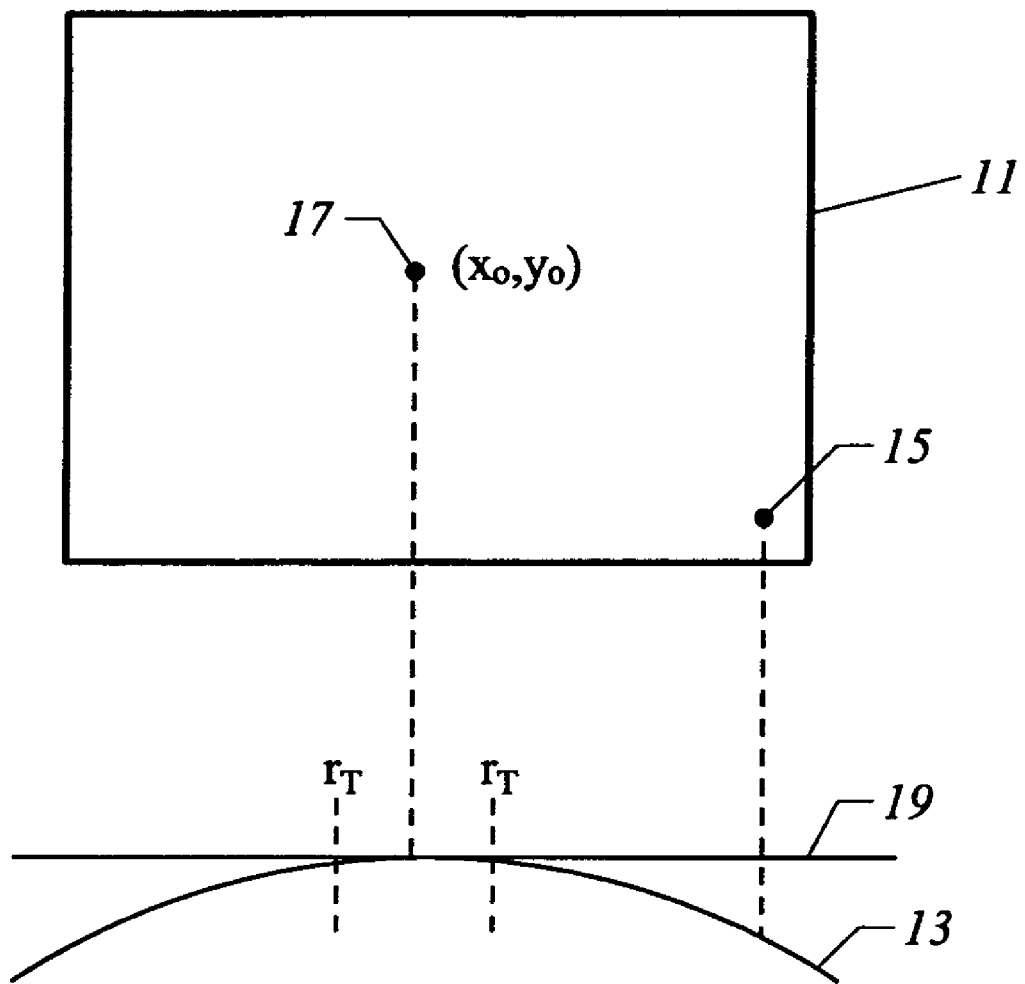
FIG. 10 is a drawing of a pixel array and brightness curve illustrating the vignetting effect.

FIG. 10 illustrates a pixel array 11 and a corresponding brightness curve 13 over the Y axis. A central pixel 17 with value ($x_0$, $y_0$) corresponds to the point of maximum brightness of the lens. A second example pixel 15 is near the minimum brightness, showing a vignetting effect of having the difference between curve 13 and a maximum brightness value 19. The present invention corrects this vignetting effect in both X and Y directions.

In one embodiment, a threshold indicated by $r_T$ is illustrated within which the curve 13 is near the maximum value 19, and no vignetting correction need be applied. Alternately, the correction can be applied to all of the pixels regardless to avoid any transition effects at the points $r_T$.

Depending upon the particular lens which is chosen, its specified vignetting amount can be used to provide a constant in a register 72. Thus, different lenses could be used in manufacturing a camera by simply programming a different constant value into register 72. This allows multiple sources to be used for the lenses, and allows compensation for changes in lens quality from lot to lot or manufacturer to manufacturer.

An embodiment of an equation for implementation and hardware or software to perform the vignetting correction is set forth below. Although the constant is stored in the camera, the vignetting correction can be done by either hardware/software in the camera, or software in a host. The vignetting defect of a low quality lens may be modeled as pass through in the middle of the lens and a parabolic curve near the edge of the lens. The transform function is isotropic. Let $p_i$ and $p_o$ be the pixel value before and after vignetting correction, and $x_0$ and $y_0$ be the coordinate of the center of the lens (should be the center of the image if the lens is mounted properly). Then, $$p_o = p_i * (a * r^2 + 1)$$
$$= p_i * (a * ((x - x_0)^2 + (y - y_0)^2) + 1$$

"a" is a small positive constant. To be on the safe side, a maximum of 50% vignetting can be corrected, which means:

$$1.0 = 0.5 * (a * (176 * 176 + 144 * 144) + 1)$$
$$a = 1.9338 * 10^{-5}$$

Normalized by $2^{26}$, this will give a=1298. By limiting a to 0 through 1023, and performing the inverse computation, the maximum correctable vignetting is 56%.

Note that in the formula given above, the pixel aspect ratio is not taken into account. For square pixel, the equation is exact, for 12/11 pixel aspect ratio, the result is slightly off. Also, a will be scaled by ¼ if the sensor format is non-scaled QCIF (subsampled QCIF from CIF by leaving out every other pixels in both horizontal and vertical directions).

If $y_i$ is 10 bits, $(x-x_0)^2$ and $(y-y_0)^2$ is 16 bits (for CIF size), and $y_0$ is 10 bits, this determines that a needs to be 10 bit (0 through 1023).

Figure 11:
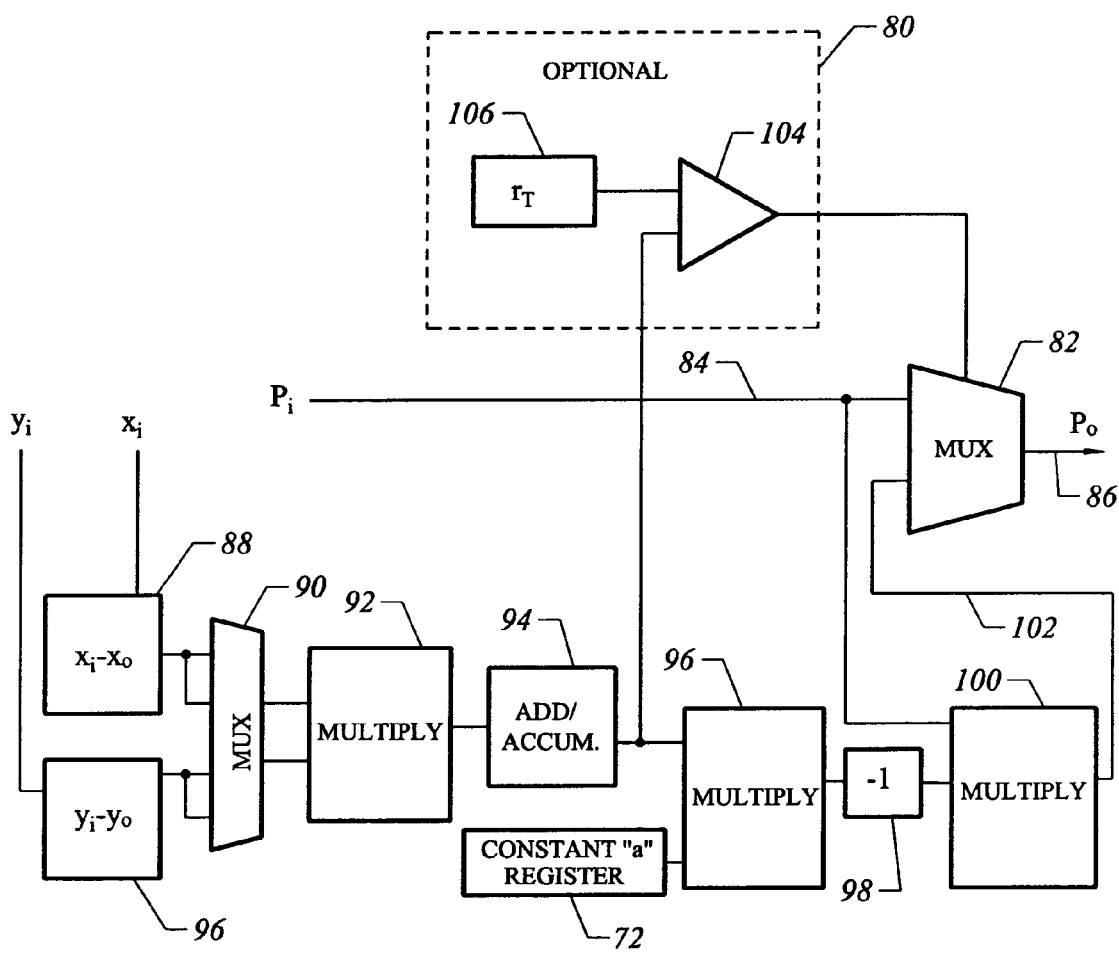
FIG. 11 is a block diagram of one embodiment of vignetting correction according to the invention.

FIG. 11 is a block diagram of one embodiment of a hardware system or software blocks for implementing the equation described above. In particular, an optional selection circuit/block 80 is applied to the select input of a multiplexer 82. Where the pixel position is less than the threshold $r_2$, the input pixel $p_i$ on line 84 is simply passed through to the output pixel, $p_o$, on line 86. If it is greater than the threshold, a vignetting correction is applied by implementing the formula above with the hardware shown in FIG. 11.

In particular, the current x value of the pixel, $x_i$, is applied to arithmetic circuit/block 88, where the central pixel, $x_0$, is subtracted from it. This value is then squared by applying its input twice, through a multiplexer 90, to a multiply circuit/block 92, where it is accumulated in an add/accumulator 94. Similarly, the y value $y_i$ is provided to a circuit/block 96, where the difference from the center y value, $y_0$, is determined. This is similarly applied as two values through mux 90 to a multiplier 92, where it is squared and provided to add/accumulator 94, where it is added to the squared x value. The use of the multiplexer simply allows, by time division multiplexing, the same multiplier 92 to be used for both calculations. Obviously, an alternative would be to provide two separate multiply units.

The output of accumulator 94 is then provided to a second multiplier 96, where it is multiplied by the constant value from register 72. The value of one is then subtracted in a unit 98, and this value is multiplied by the pixel value, $p_i$, in a multiplier 100. The output is provided on a line 102 through multiplexer 82 to output line 86. Obviously, variations of the circuitry could be provided, such as using the same multiply circuit for multipliers 92, 96 and 100, with the multiplier being used for different purposes in different time slots.

Optional circuit/block 80 provides a comparator 104 which compares the output of add/accumulator 94 (the radius value of the $x^2+y^2$ values) to the threshold radius in a register 106.

Preferably, the constant a has the same number of bits as the pixel value, $p_i$. Thus, if $p_i$ is 10 bits, while the x and y values are 16 bits, the constant a would be 10 bits. Also, a can be scaled by ¼ if the sensor format is non-scaled QCIF (cropped). Thus, correction is provided where the image is cropped before the vignetting correction.

In addition, correction can be done for the pixel aspect ratio by multiplying the y value by 11/12 where a TV will be used.

In one embodiment, the correction will take place only outside a predefined diameter. This assumes that the lens performs satisfactorily around the center of the lens, which is often a reasonable assumption. By doing so, a more accurate correction model can be derived. Let $r_T$ be the diameter within which the vignetting defect can be ignored. Then, If $r <= r_T$, $$p_o = p_i,$$

If $r > r_T$.

$$p_o = p_i * (a * (r^2 - r_T^2) + 1)$$
$$= p_1 * (a * (((x - x_0)^2 + (y - y_0)^2) -$$
$$((x_T - x_0)^2 + (y_T - y_0)^2)) + 1)$$

The present invention thus allows variation in lenses and also cheaper lenses to be used. It improves the AGC and AWB in the host computer. Additionally, it allows better object motion tracking. Object motion is usually done by assuming the luminance value is the same as the object moves to the edge of a sensor, and thus tracking by looking for the same luminance value. Obviously, vignetting effects can thwart the efforts to locate the object. By applying the vignetting correction close to the sensor, this can be overcome. The invention also provides overall improved video quality.

IV. Pixel Correction.

Block 42 of FIG. 2 performs pixel correction in the host. This allows for defective detector locations on the CMOS or CCD sensor array to be corrected. In general, this is accomplished by comparing a brightness value to the brightness value of the neighboring detector elements. If the difference is more than a threshold value, it is assumed that this is due to a defective sensor element. Accordingly, a corrected value will be substituted, typically an average of the surrounding pixel values.

In order for this to be done in the host without affecting the frame rate of the video, the algorithm is kept simple. This is accomplished through two primary features. First, the defective pixel detection is not done on any frame, but only on a subsample of the frames. For example, the detection may be done only every 32–128 frames. Second, the statistics kept are simple, to reduce the amount of processing required. In particular, the statistics may include simply the location of the pixel element, and the frequency or number of times a defective pixel has been detected.

The system works by reading off or scanning the raw image data from an image pickup device for pixels that vary more than a specific amount in intensity from their neighboring pixels. The raw image sensor data is the unprocessed brightness data output obtained from the image sensor and which has not gone through any lossy compression or color processing. The image sensor reads analog voltage or current, converts to digital and sends the signal to a host with no further processing or compression. The photosites on the image sensor are used to capture either color or monochrome digital still or video images. The raw image data is sent to the intelligent host over a bus with a data transfer rate which is determined by the bus protocol of the particular bus such as a universal serial bus (USB) or a parallel port.

The raw image sensor data, the location and frequency of occurrence of each defective pixel, and the results of all intermediate computations performed by the computer program are all stored in memory. Other algorithms are then used to average the values of an anomalous pixel's neighboring pixels to replace the data from the defective pixel. The corrected data can then be further processed and ultimately displayed on the monitor. The process includes video subsampling, meaning that the detection is carried out and repeated at various frame intervals. The video subsampling is carried out on one of every 128 (1/128) frames. Alternately, the video subsampling can be carried out on every 1/64 video frames. And yet in an additional embodiment, the video subsampling is carried out on every 1/(n times X) frames, where n is an integer and X is not equal to 50 or 60. 50 and 60 correspond to 50 Hz and 60 Hz, which are AC lighting frequencies used in the United States and Europe respectively. This way, it is ensured that anomalous raw data pixels are not artifacts of the artificial lighting systems. The use of video subsampling allows for rapid and optimum corrections without the need to scan every frame which would adversely impact the processing speed of the processor and the system. Naturally, no video subsampling is employed when detecting and correcting defective pixels in still images.

A statistical database recording the location and the frequency of occurrence of defective pixels is generated and stored in memory to allow the system to learn and adapt its operation over time. The trends from the statistical database are stored so that truly anomalous pixels can over time be distinguished from false detection of true anomalies in the target image, lighting or other environmentally induced anomalies. The operations logic of the statistical database and the details of the operation of the computer program are described below.

Figure 12:
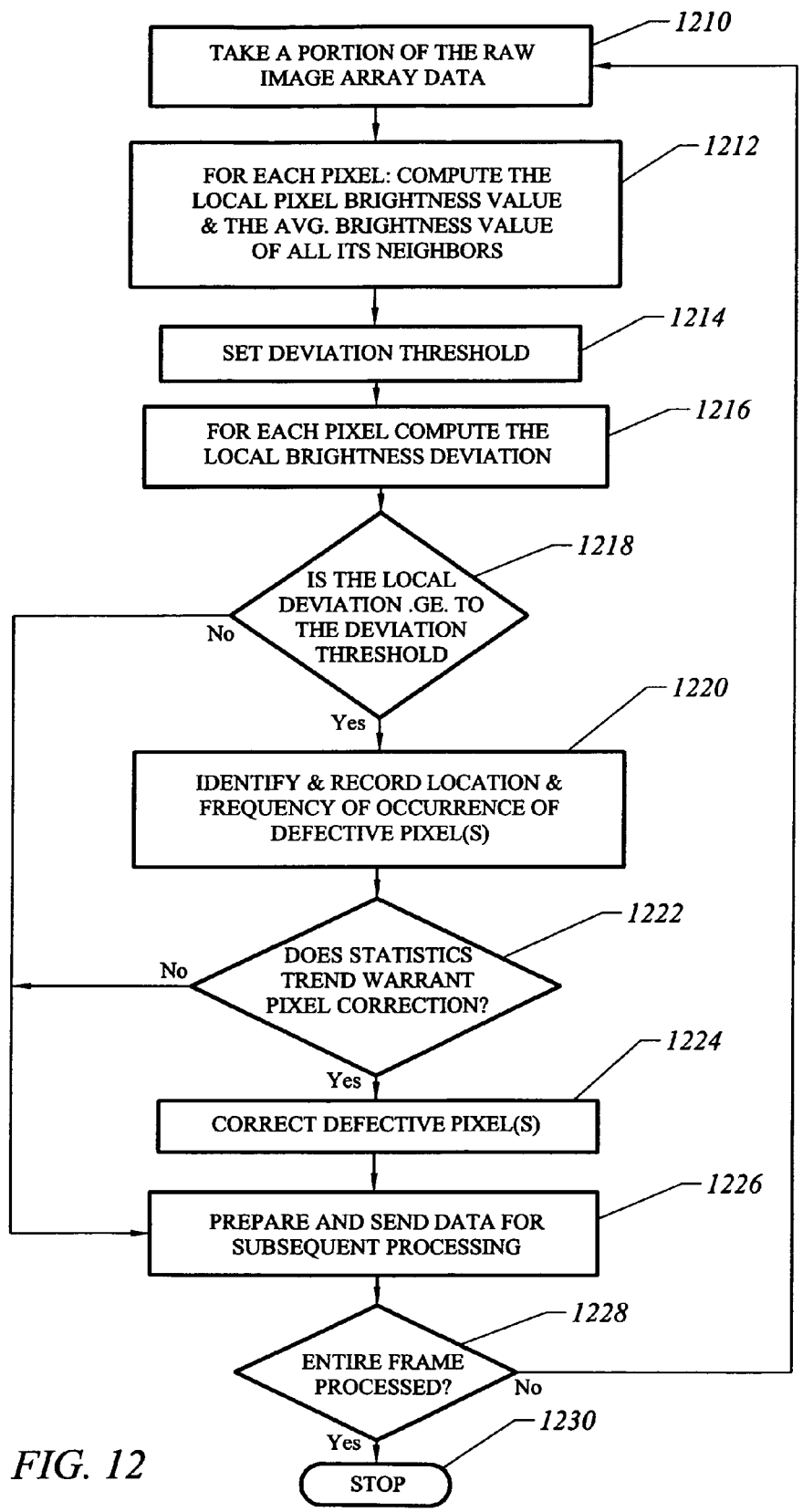
FIG. 12 illustrates a simplified flow chart of a method of detecting and correcting defective pixels according to one embodiment of the present invention.

FIG. 12 illustrates a simplified flow chart describing the functioning of the software program implemented in a system for detecting and correcting defective pixels according to one embodiment of the present invention. The first step in defective pixel detection and correction includes acquiring a portion of a frame of raw image data from an image sensor array, step 1210. The raw image data may be data corresponding to a live scene being digitized or it may be data corresponding to a calibration or "black" background image. The "black" background image may be obtained by reducing the integration time of the sensor array or by reducing the gain of the image signal. The raw data from the "black" image can be used to detect over active photosites. The raw data corresponding to the "black" image must also be black, and if any pixel is not, then it corresponds to an overactive photosite. The use of the "black" image can enhance defective pixel detection by removing any brightness deviations that originate from the scene itself.

Although the data from an entire frame can be processed at one time for defective pixel detection and correction, the algorithm begins its function as soon as data from three lines from the image sensor has arrived at the host. Three lines of data from the image sensor array will allow for the processing of data for a pixel and all its surrounding neighbors. Moreover, when the sensor array is being used to capture video images, video subsampling is used so that not every frame of the video captured by the image sensor array is required for the defective pixel detection operation. In a preferred embodiment, defect detection is carried out at predetermined frame intervals as described above and the correction is applied to all video frames. The judicious use of video subsampling allows for the method to be very fast and efficient.

In an alternate embodiment, no video subsampling is used such that the defective pixel detection is carried out on every video frame. The use of video subsampling is a function of the intelligent host's processor speed. If a processor is fast enough to allow detection of anomalous pixels in every frame, then video subsampling is not used. If, on the other hand, the processor is not fast enough to allow video processing at a desired frame rate, then video subsampling is used to ensure data transfer at that desired frame rate. Without video subsampling, anomalous pixel correction is immediate, such that defects are corrected in the very frame in which they are detected. With video subsampling, anomalous pixel correction is delayed until a frame is sampled to detect anomalous pixels. Therefore, the choice of using video subsampling, and the rate of subsampling are a function of the processor speed and a trade off between processor power and the delay before correction.

After data acquisition, for each of the acquired pixels, the local pixel brightness value and also the average brightness value of all its immediately neighboring pixels are computed and stored, step 1212. Next, a deviation threshold value is established, step 1214. The deviation threshold establishes the acceptable level of variance between a pixel's brightness value and the average brightness value of all its immediately neighboring pixels. Next, for each acquired pixel, a local brightness deviation is computed, step 1216. The local brightness deviation is the absolute value of the difference between a pixel's brightness value and the average of the brightness value of all its immediately neighboring pixels.

Next, for each pixel whose data that has been acquired, its local brightness deviation is compared to the deviation threshold, step 1218. Any pixel whose local brightness deviation exceeds the threshold deviation value is then flagged as a defective pixel. The physical location and the frequency of occurrence of each defective pixel is then recorded in a statistical database, step 1220. The statistical database is then queried, to determine whether the defective pixel's data value should be corrected, step 1222. The statistical database, by storing the location and frequency of defective pixels, develops over time trends which confirm which of the defective pixels warranted correction. The logic of the trends from the statistical database initially warrant correction of all flagged defective pixels as a default, and over time warrant pixel correction only if a particular pixel has an occurrence frequency of at least two out of the last four queries.

The defective pixels that have passed through the statistical database filter are corrected next, step 1224. In order to correct a defective pixel, the erroneous raw brightness data for a defective pixel is replaced by that pixel's local average brightness value, which is the average brightness value of all its immediately neighboring pixels. Next, the corrected data from the defective pixels as well as data from non-defective pixels is prepared to be sent for subsequent processing, step 1226. Subsequent processing may include compression, color processing and encoding to data formats suitable for display. The defective pixel detection and correction is carried out on the raw data from the image sensor array because it is preferred to correct the data before any subsequent processing has occurred since that processing itself can introduce artifacts which are hard to distinguish from artifacts which have been produced as a result of defective photosites.

The software algorithm is intentionally kept very simple so that the processor load and/or the video frame rate is minimally affected. First, the software algorithm is kept simple because it only performs three functions, namely the detection, correction and statistics functions. The statistics routine is kept simple because only position information and frequency of occurrence of anomalous pixels are tracked. Second, the software algorithm is kept simple so as to have a minimal impact on the rate at which data is transferred to the host, so that while a frame is being scanned for defective pixels, subsequent frames are not held up. The maximum impact of the software algorithm is to at worst reduce the video data transfer rate from 10 frames per second (fps) to 9 fps. Third, the software algorithm is kept simple such that the host processor's load is not increased by more 1% when executing the algorithm. The anomalous pixels are detected in one frame and the corrections are later instituted on subsequent frames as they are read off the image sensor.

Therefore, when the system is operating, as raw image data from the image sensor is obtained and sent to be processed on a host, frames are captured for defective pixel detection and correction as described above. Once a defective pixel has been identified and its correction has been warranted by the statistical database, that correction will continue for all subsequent frames until the next query is made to the statistical database. If at that time the initially flagged defective pixel continues to be designated as a defective one, then the corrections will continue as described above. If on the other hand, the statistical database does not warrant the correction of defective pixels, then those pixels will no longer be corrected until the next query to the statistical database is made. The dynamic nature of this system will also allow for corrections of data from photosites that become defective over time due to post-manufacture environmental changes.

The statistical analysis segment of the defect detection and correction algorithm is an optional one. It is aimed at increasing the efficiency of the pixel corrections, so as not to correct anomalies that were not caused by defective photosites, and hence save processing time and load. However, the gains in efficiency must be balanced against the load imposed by the statistical analysis portion itself. In an alternate embodiment not employing the statistical analysis portion, all pixels that get flagged as defective get corrected. As in the choice of using or not using the video subsampling, the decision to employ the statistical analysis portion of the defect detection and correction algorithm depends on a trade off between efficiency and processor power. If the processor is fast enough, then efficiency concerns are not so important. On the other hand, if the processor is not fast enough, then pixel correction efficiency becomes important enough to warrant the implementation of the statistical analysis portion of the defect detection and correction algorithm.

As will be understood by those of skill in the art, the present invention may be embodied in other specific forms without departing from the essential characteristics thereof. For example, the rate of video subsampling could be varied, or not done at all. Alternately, the logic of the optional statistical database could be altered from one of correcting defective pixels as a default to one where defective pixels are corrected only if warranted by the trends from the statistical database.

V. No Frame Buffer Memory.

The elimination of the processing in the camera allows the elimination of the frame buffer memory, since digital pixel data need not be stored for such processing. However, another potential problem is that the output of data from the sensor needs to be held pending availability of the bus. This can require a very large buffer memory. In one embodiment of the camera, only a small buffer in the bus interface is used. A small buffer is achievable by controlling the timing of when the sensor is read to correspond to when the host bus is available, and reading only an amount of data which can be buffered until the next bus availability.

Figure 13:
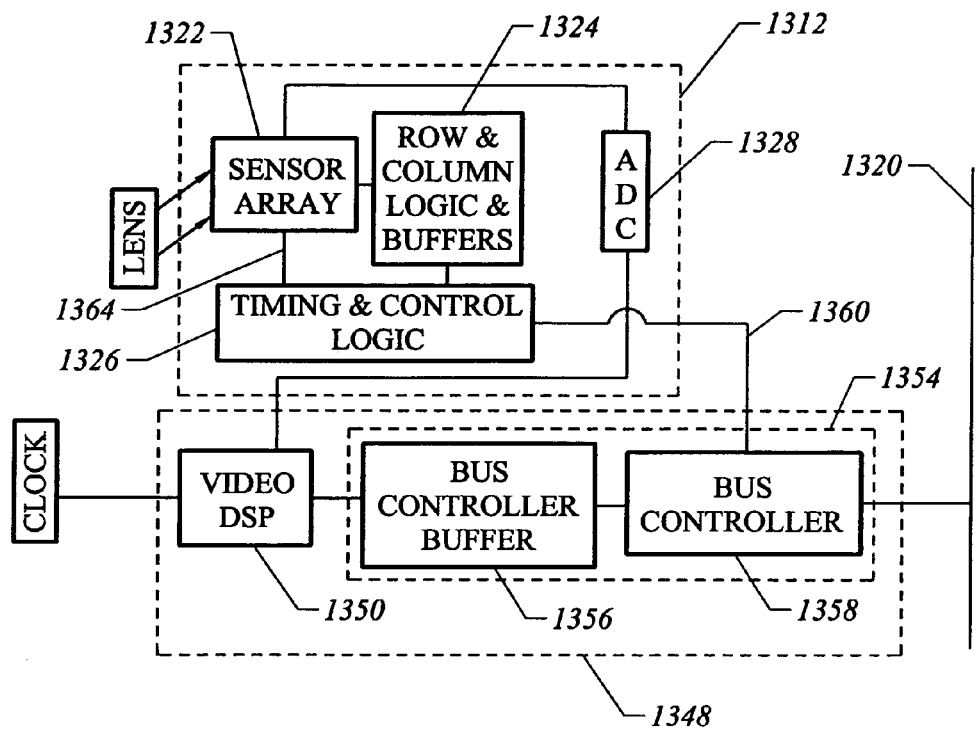
FIG. 13 is a block diagram of a video camera system according to one embodiment of the present invention.

FIG. 13 is a block diagram of a video camera according to the present invention. This system includes a lens 1310 and a sensor array, such as a CMOS sensor array 1312, and is connected to a USB 1320.

The digitized signals from the CMOS sensor chip, rather than being stored in a frame buffer memory as in the prior art, are provided directly to a digital processing circuit 1348. They are first provided to a video digital signal processor 1350 which performs the compression, and optionally order functions to minimized data transfer, such as cropping, scaling and digital filtering. Once processed, the digital data is provided to a bus interface 1354.

Bus interface 1354 includes a bus controller buffer 1356 and a bus controller 1358. Buffer 1356 stores at least a single line of data from a CMOS sensor row. Preferably, bus controller buffer 1356 is capable of storing two USB frames at the maximum possible rate, or 2 Kbytes. Depending upon the frame rate, compression rate, etc., this may typically vary up to 10 lines, or even to 15–20 lines if decimation is done.

Bus controller 1358 provides a control signal on a line 1360 to timing and control generator 1326. Timing generator 1326 provides clocking signals on line 1364 to CMOS sensor array 1322. Clocking signals 1364 include the row and column transfer pulses. The column transfer pulses are provided as in the prior art, periodically loading the charged values from the CMOS sensor array. However, the row transfer pulses are varied to match the reading of the data out of the CMOS sensor array with the processing by the following circuitry and the transferring of data to the USB.

In one embodiment, the digital processing circuit 1348 is integrated onto the same semiconductor chip substrate as CMOS sensor array 1312, timing generator 1326, ADC 1328, and the row and column logic and buffers. The elimination of the frame buffer allows this single chip. This allows a more compact, less expensive video camera to be built.

Figure 14:
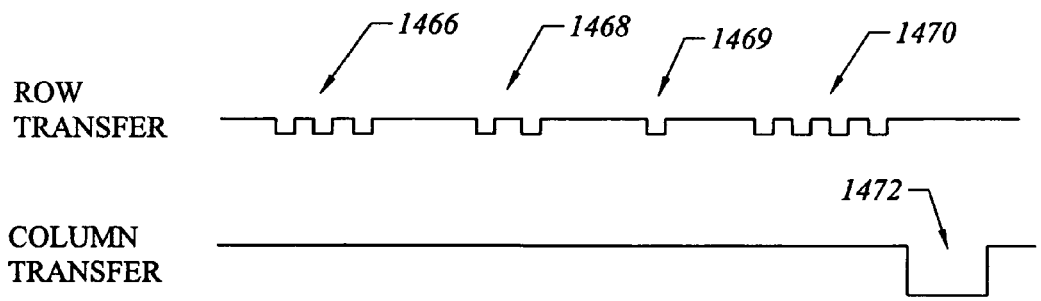
FIG. 14 is timing diagram of the pulses provided to a CMOS sensor array in accordance with one embodiment of the present invention.

FIG. 14 illustrates the timing of the row transfer pulses provided on line 1364. Rather than a continuous stream of pulses, the bits are clocked out as needed by the processing circuit in groups as illustrated. A first group of three lines 1466 is issued, and then there is a delay while these pixels are processed and transferred to the bus. Then, a next of group of two lines 1468 may be provided. There might then be a delay depending upon the availability in the line buffer and the timing of transfer of data onto the USB. A single line 1469 is shown being transferred next, followed by a subsequent group of four lines transferred by a number of pulses 1470. After an entire image has been transferred, a vertical transfer pulse 1472 is provided. The example of FIG. 14 is intended to be simply illustrative. Note that because the row transfer pulses are provided between the same column pulses, in order to allow the gaps shown, the pulses are provided much closer together. Thus, bursts of small groups of pulses are provided to quickly send pixel data as fast as the circuitry can handle it. In one embodiment, an entire image may be clocked out in a series of closely spaced pulses, allowing the processing to complete before the next column transfer pulse. If the processing still is not completed at the time of the next column transfer pulse, there can be a delay, which conforms to the timing of the processing and the availability of the USB. Thus, the row pulses may all be sequentially provided, but at a faster rate than in the prior art and the timing of this grouping of pulses after the column pulse can be varied to be right after, or just before the next column pulse, in order to accommodate the processing and bus timings.

VI. No Compression.

In one embodiment of the invention, the compression block 26 and decompression block 38 of FIG. 2 can be eliminated. This may be done, for example, when a new USB is developed with higher bandwidth. However, prior embodiments may still be desirable if increased sensitivity sensors are developed, allowing higher resolution video image data to be transmitted, using up the additional bandwidth made available. However, one embodiment takes advantage of the additional bandwidth by eliminating the need for compression, thus further simplifying the video camera and reducing its cost.

The same major functions shown in FIG. 2 would be performed in the host, with the exception of the decompression. The camera would still include the correction register 34 in one embodiment, allowing for the inexpensive lens 10 to be used.

VII. Lossy Compression.

In an alternate embodiment, a lossy compression method may be used. Lossy compression means that the recovered image may lose some resolution. A disadvantage of lossy compression is that any vignetting or pixel correction done in the host would be degraded. Accordingly, in this alternate embodiment, the vignetting correction and the pixel correction is done in the video camera itself. This allows a lossy compression block to be used for block 26 of FIG. 2. The color processing and scaling operations are still performed in the host, thus providing a simpler camera than the prior art of FIG. 1.

As will be understood by those of skill in the art, the present invention may be embodied in other specific forms without departing from the essential characteristics thereof. For example, in one embodiment the correction register can correct for features of a camera that can vary from camera to camera on manufacture, other than features of the lens. Instead of a physical shared bus, the data can be wirelessly transmitted from the camera to the host, or to a receiver connected to the host. The host itself can be a personal computer, an intelligent Internet device, or any other appliance or component with some sort of processor or processing circuitry. Accordingly, the foregoing description is intended to be illustrative, but not limiting, of the scope of the invention which is set forth in the following claims.

What is claimed is:

1. A video camera system comprising:
    (a) a video camera having
        an image sensor, and
        a processing element for performing data compression;
    (b) an interface coupled to said video camera; and
    (c) a processing unit for receiving compressed data from said interface, said processing unit being configured to perform
        decompression of said compressed data, at least a portion of the operations of said decompression being performed in parallel,
        anomalous pixel correction, and
        color processing;
        such that anomalous pixel correction and color processing circuitry is not needed in said video camera, and said anomalous pixel correction is performed prior to said color processing.

2. The video camera of claim 1 wherein said video camera includes a lens, and said processing unit is further configured to perform vignetting correction for said lens.

3. The video camera of claim 1 further comprising a memory element in said video camera for storing a constant value corresponding to an amount of vignetting of said lens.

4. The video camera of claim 1 wherein said anomalous pixel correction is designed to minimize its impact on video frame rate by including video sub sampling to determine defective pixels and statistical recording of only pixel position and data related to the frequency of detected defective pixels.

5. The system of claim 1 wherein said processing unit comprises a processor having instructions for operating on multiple pixels in a register in parallel, said processor being programmed for decompression a data stream of variable size compression codes, wherein at least a portion of the operations of the decompression are performed in parallel on multiple fields in said register.

6. The system of claim 5 wherein said data stream is compressed using Huffman encoding, and said operations include:
- duplicating a group of bits from said data stream to provide duplicates in multiple positions in a first register; and
- performing an operation between values in a second register and said duplicates in parallel, with a different value being used for each duplicate.

* * * * *